Aug. 11, 1942.    H. J. PAYNTER    2,292,402
MACHINE FOR MAKING FIBER CONTAINERS
Filed Dec. 29, 1938    14 Sheets-Sheet 4
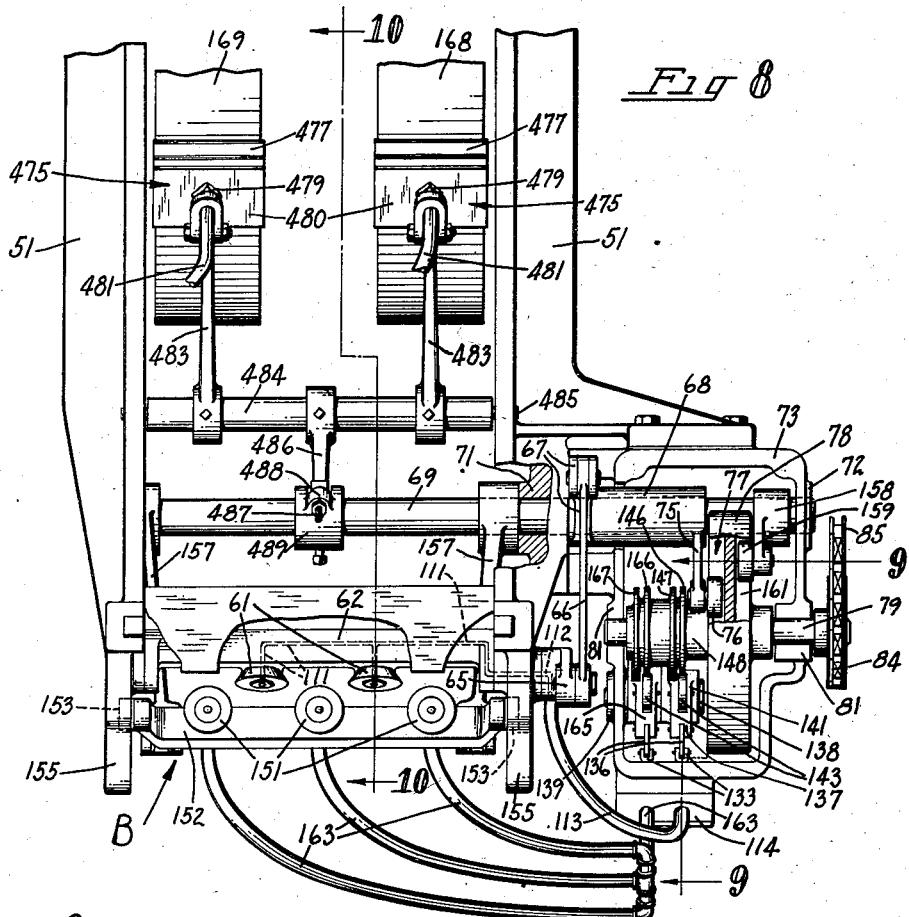
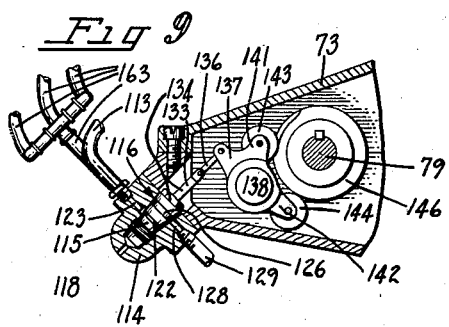
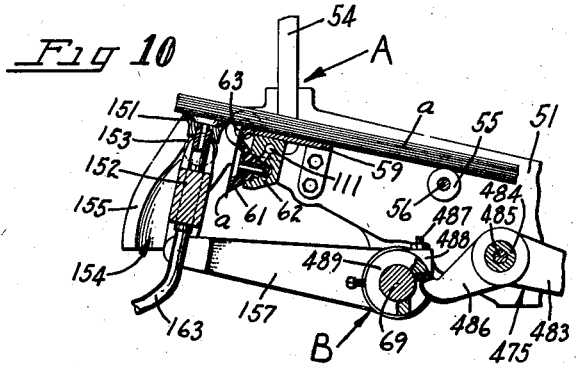

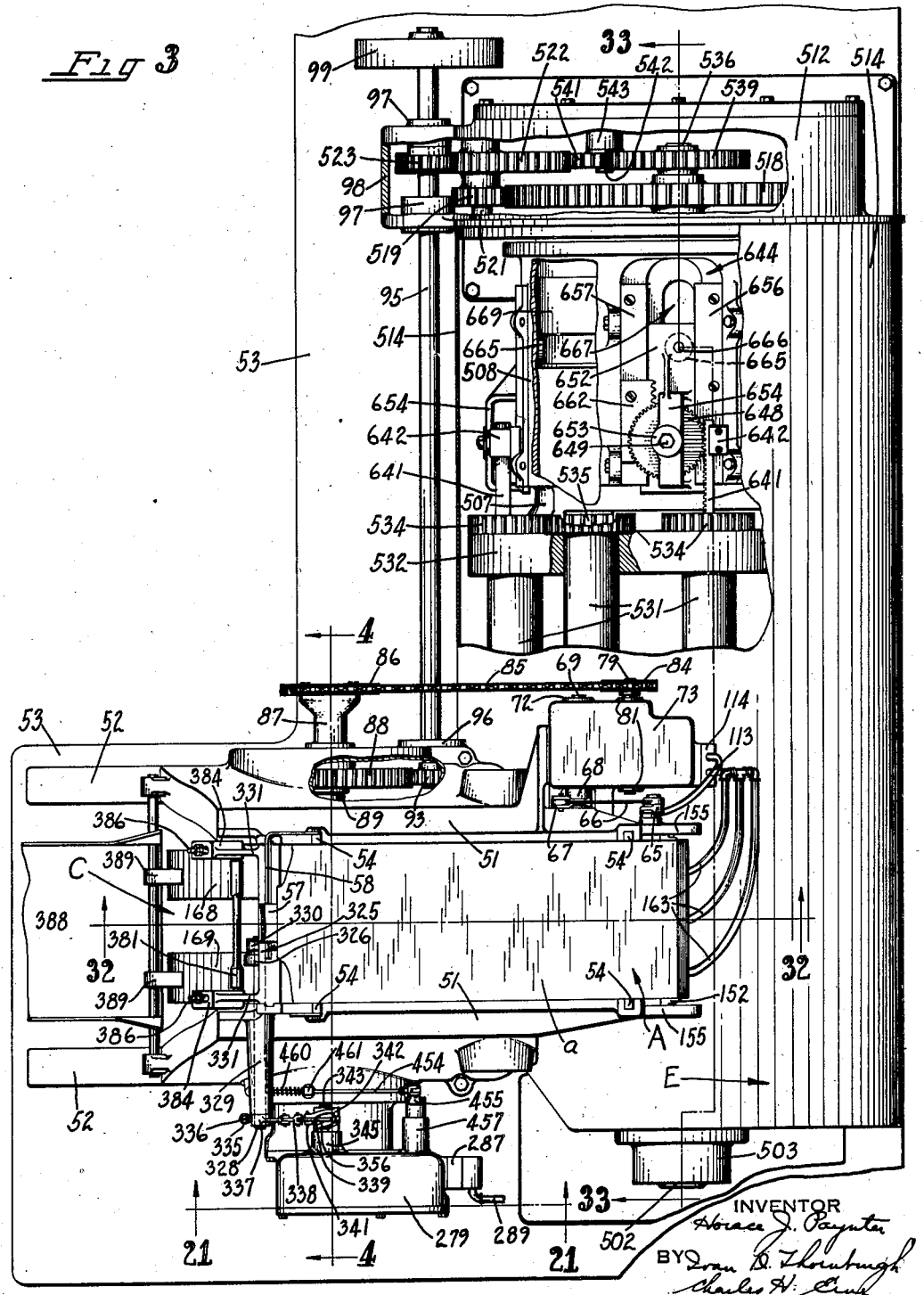

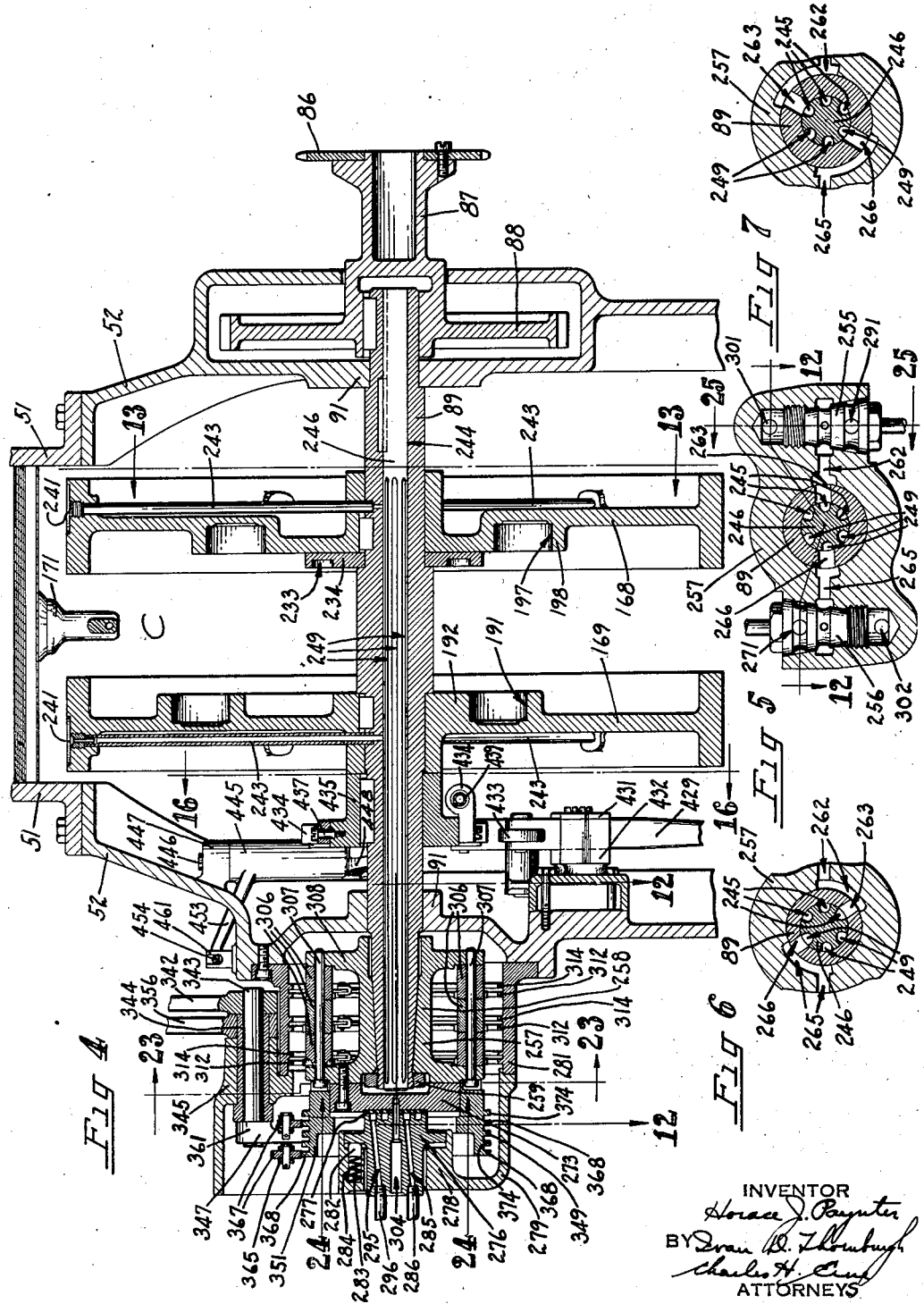

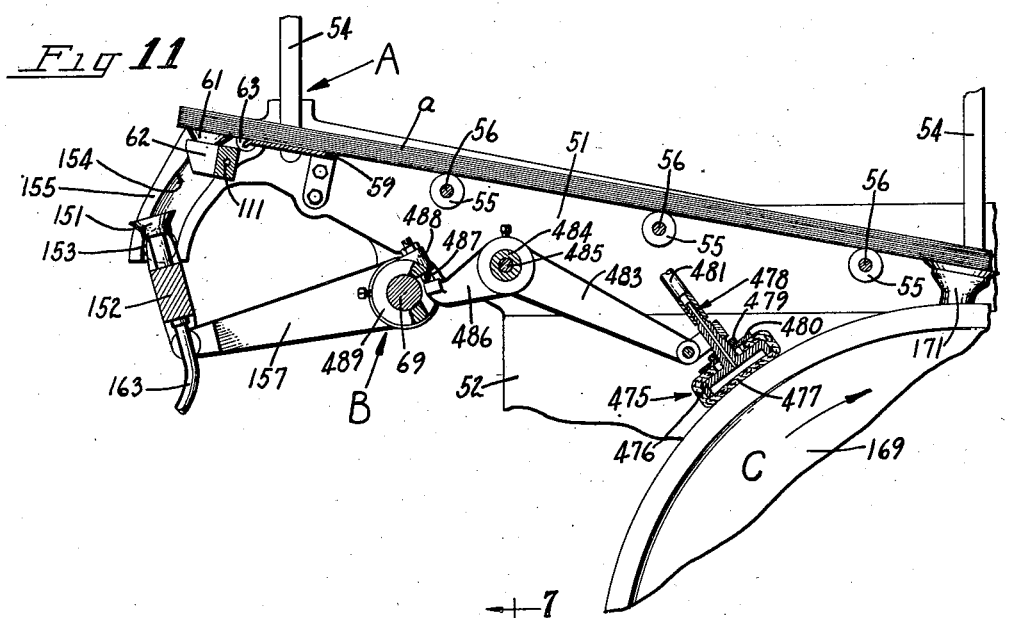
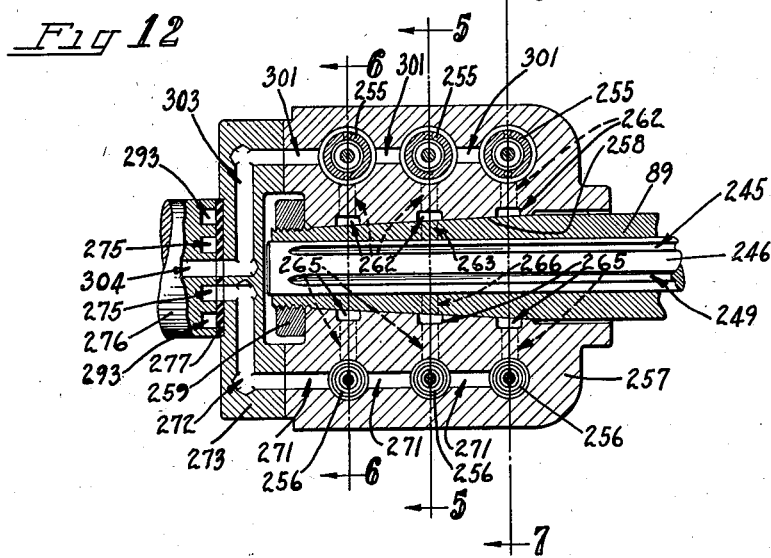

Aug. 11, 1942.     H. J. PAYNTER     2,292,402
MACHINE FOR MAKING FIBER CONTAINERS
Filed Dec. 29, 1938     14 Sheets-Sheet 7
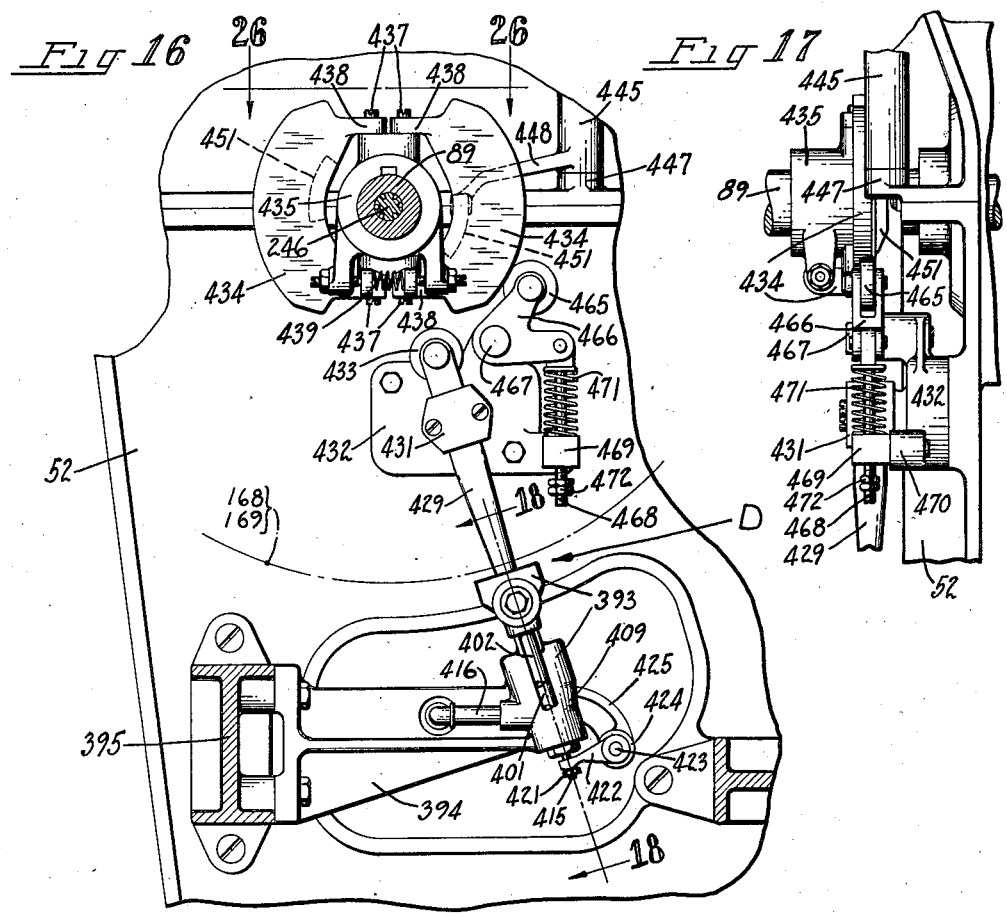
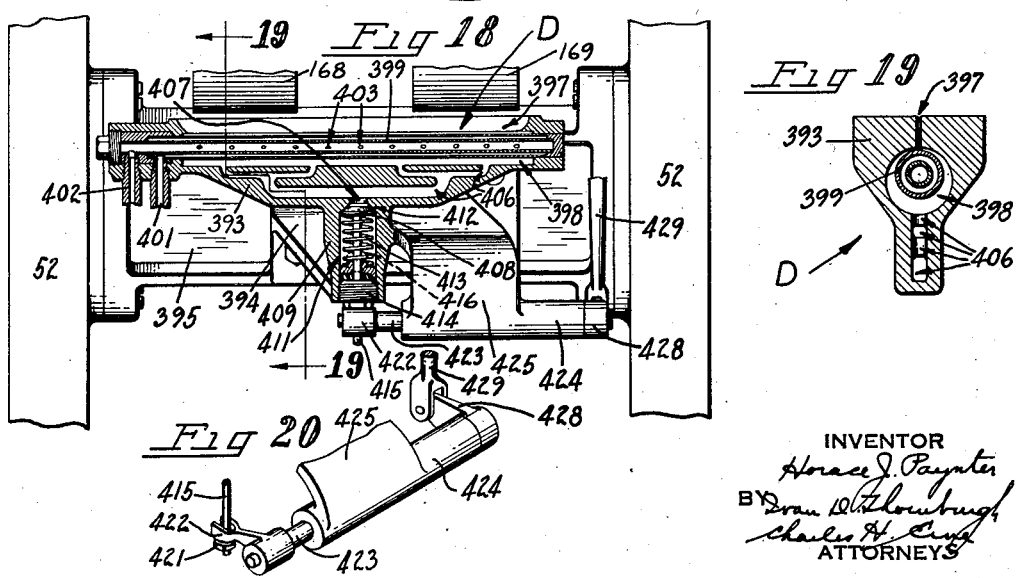
INVENTOR
Horace J. Paynter
BY
ATTORNEYS

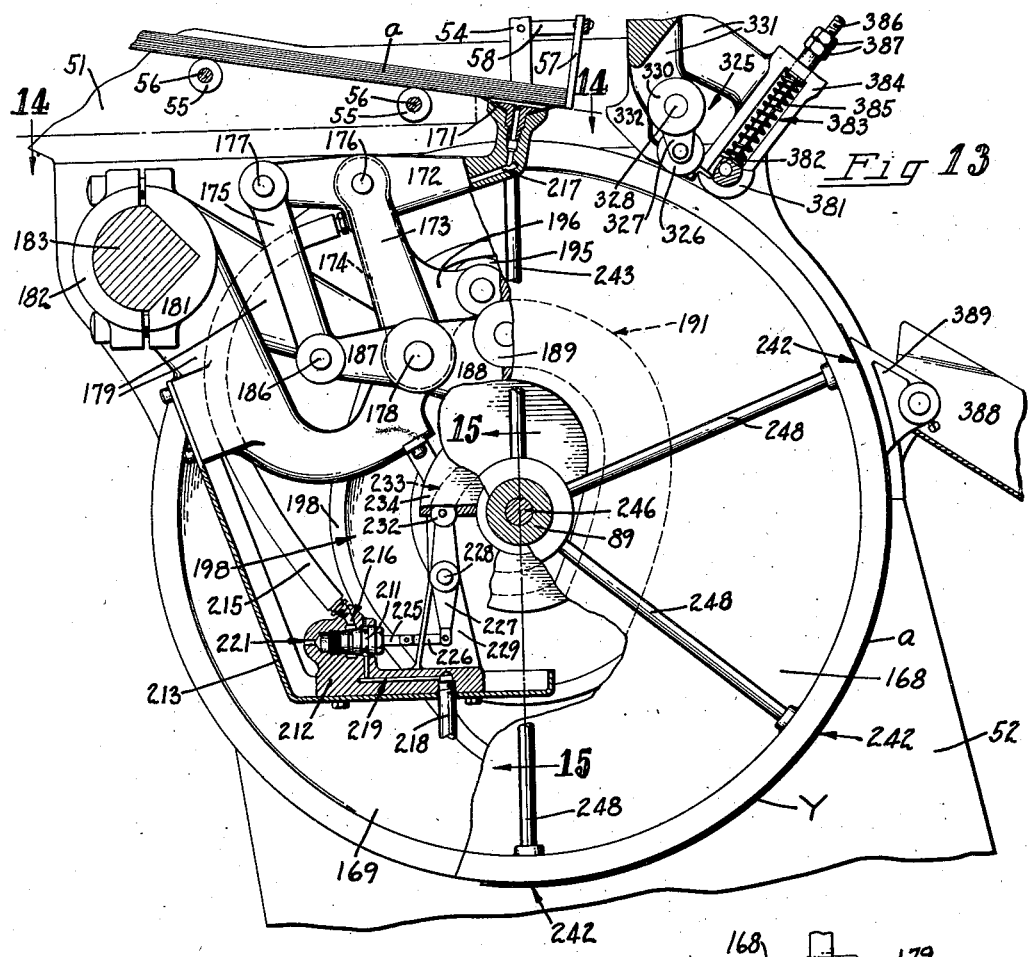
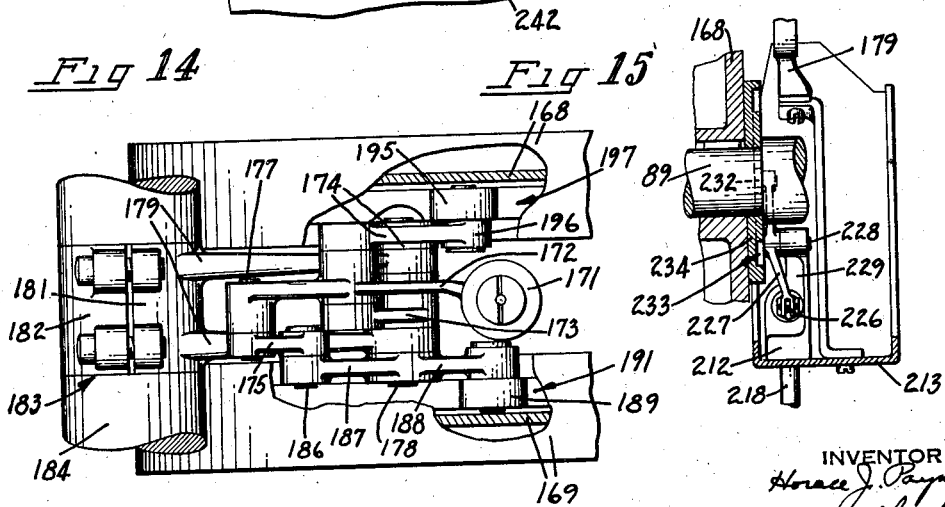

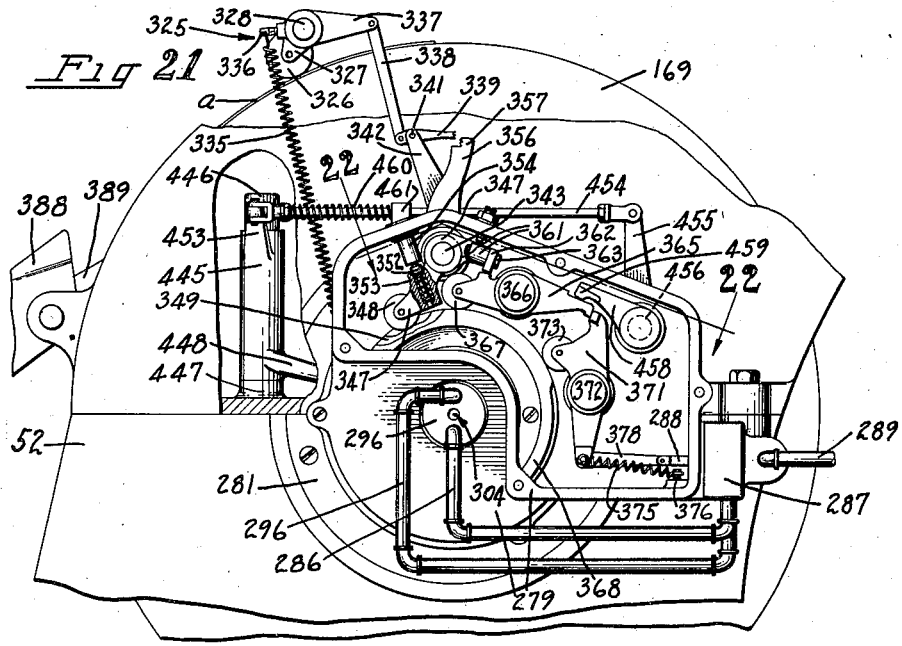
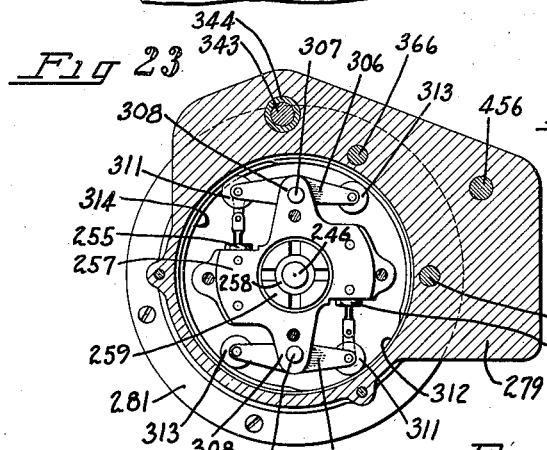
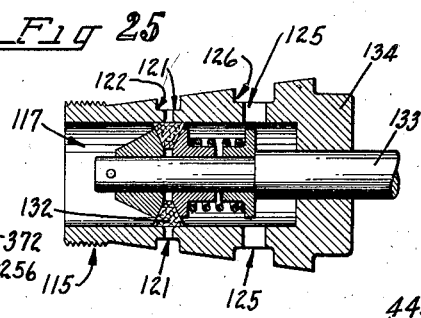
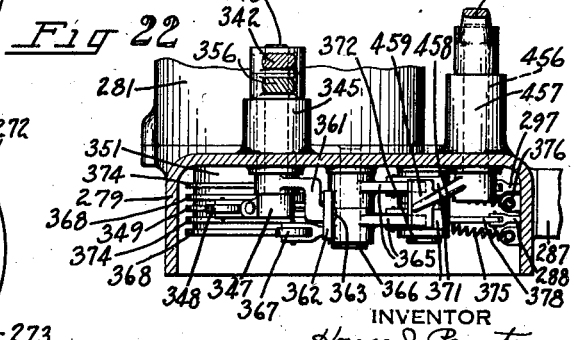

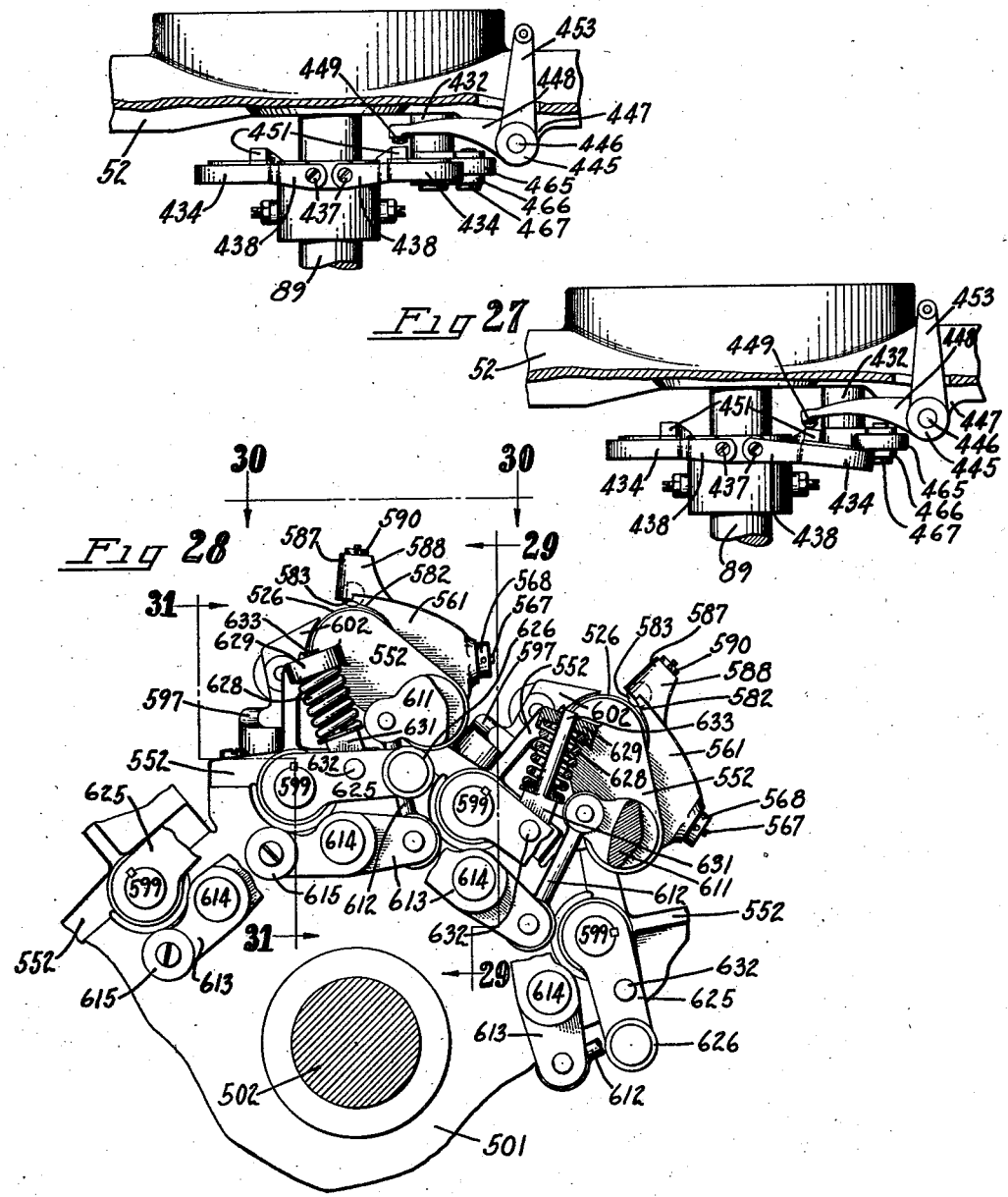

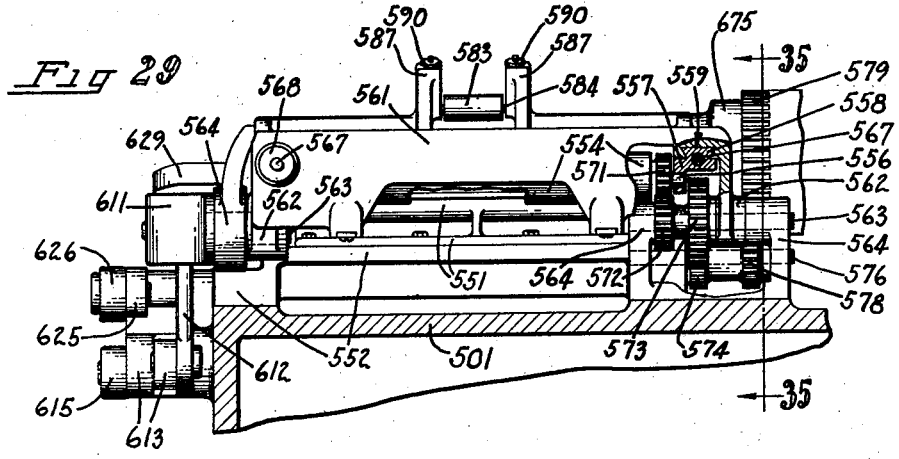
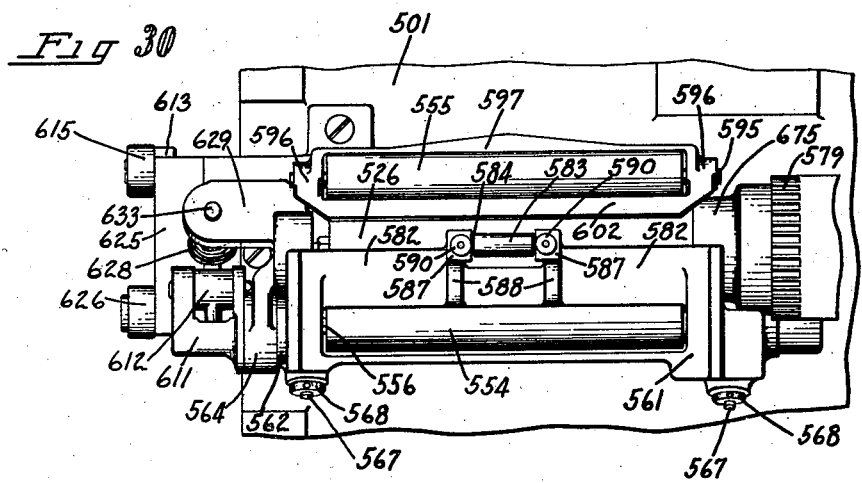
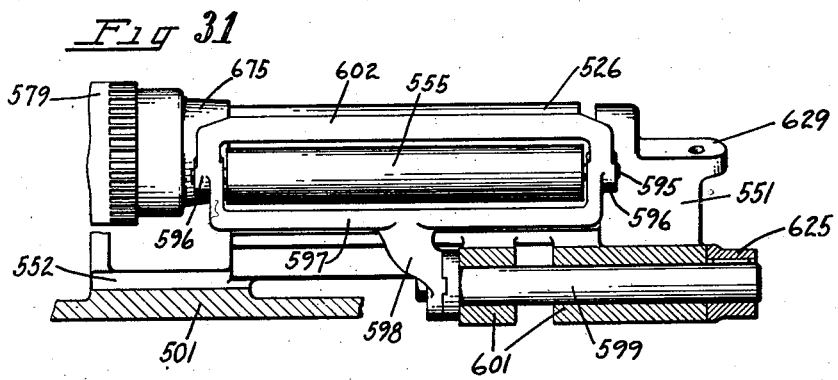

Aug. 11, 1942.  H. J. PAYNTER  2,292,402
MACHINE FOR MAKING FIBER CONTAINERS
Filed Dec. 29, 1938   14 Sheets-Sheet 11

INVENTOR
Horace J. Paynter
BY
ATTORNEYS

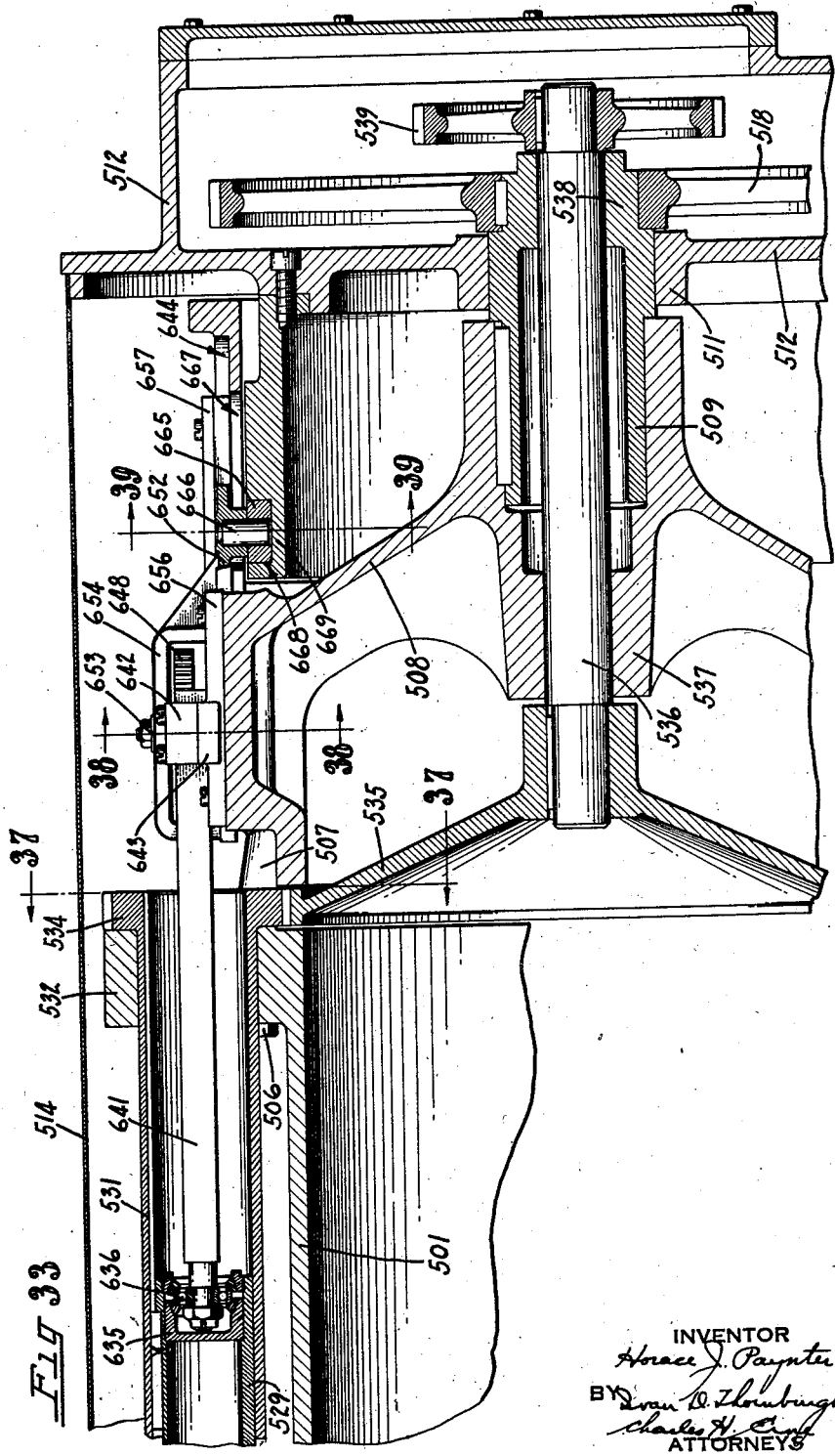

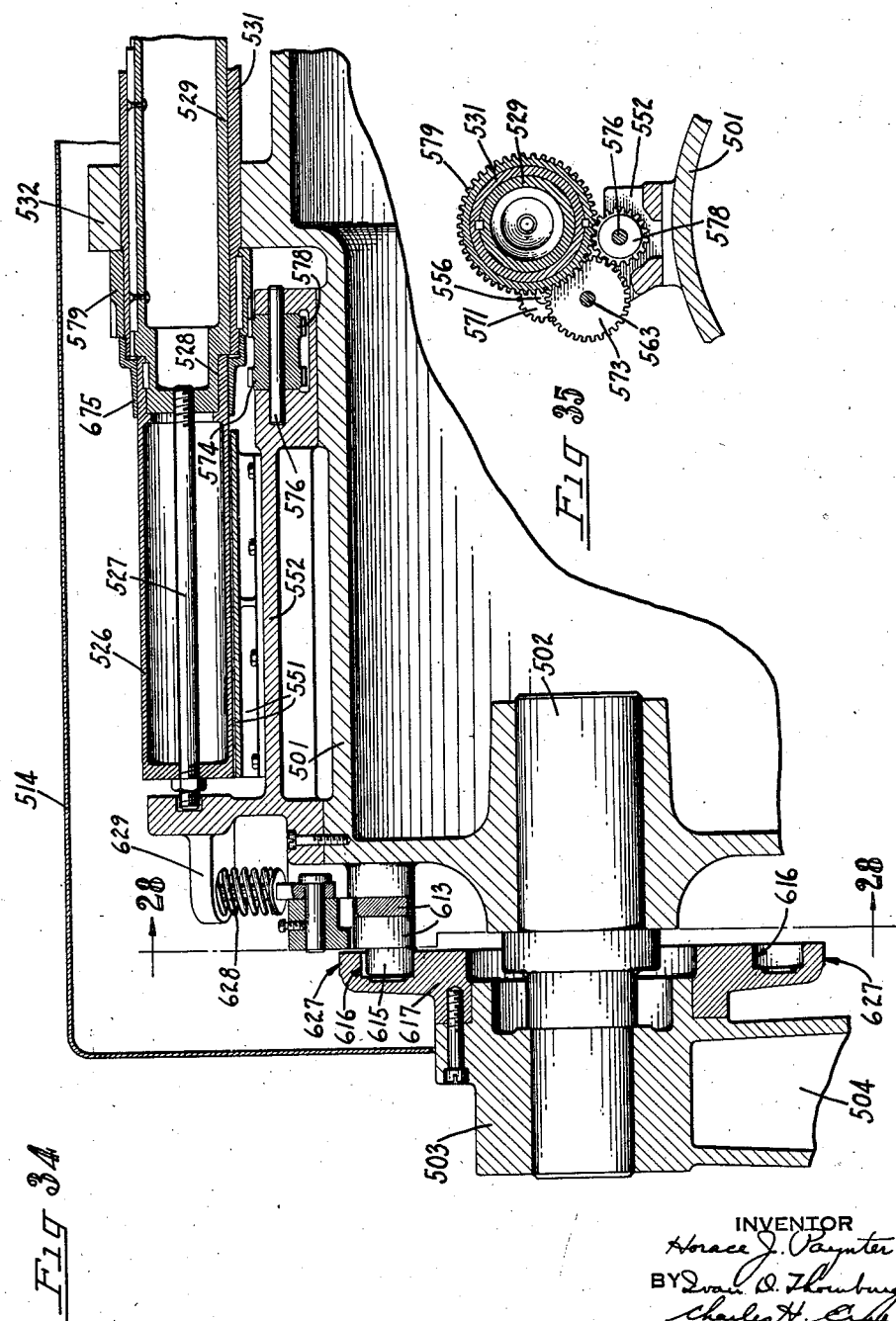

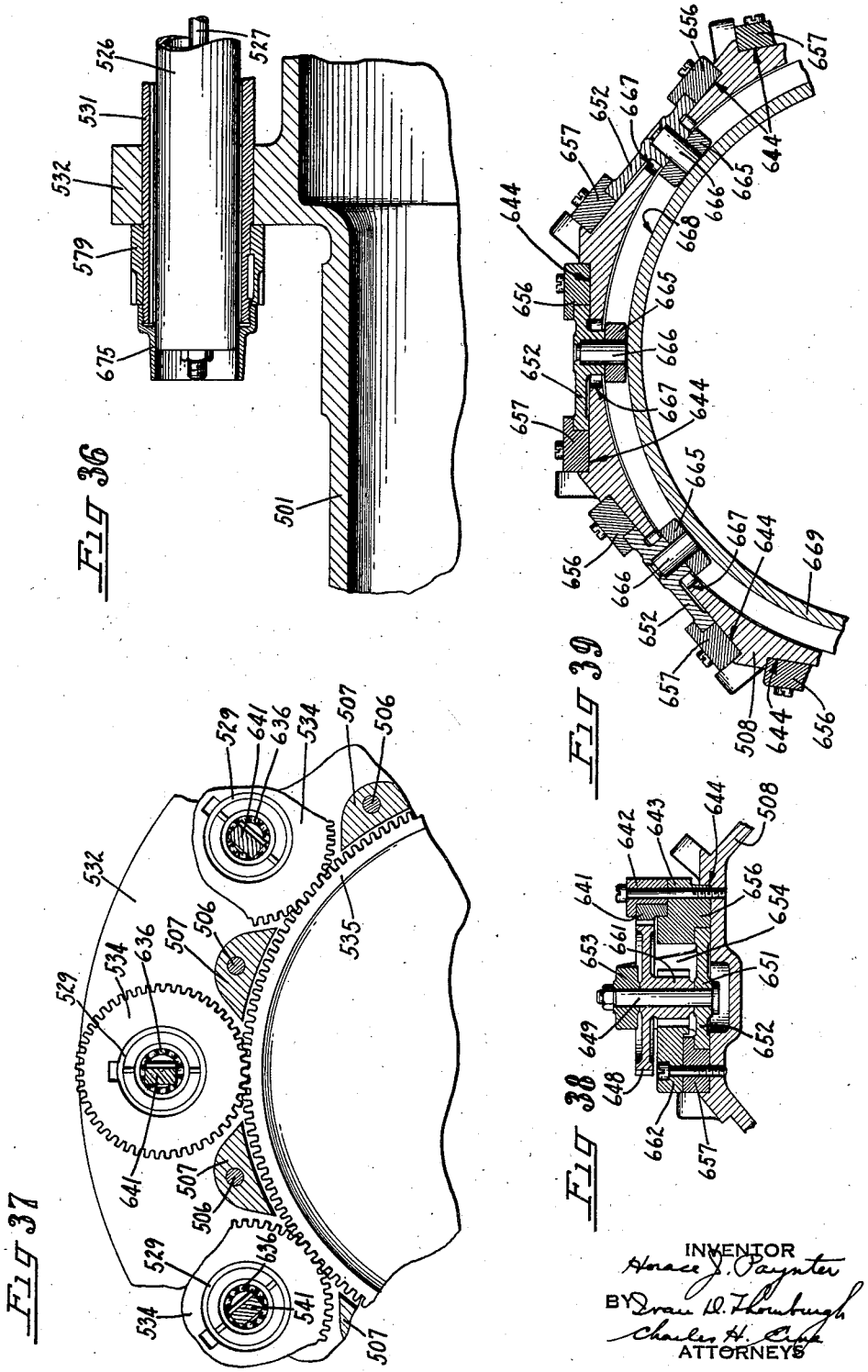

Patented Aug. 11, 1942

2,292,402

UNITED STATES PATENT OFFICE 2,292,402

MACHINE FOR MAKING FIBER CONTAINERS

Horace J. Paynter, Union, N. J., assignor to American Can Company, New York, N. Y., a corporation of New Jersey Application December 29, 1938, Serial No. 248,338

18 Claims. (Cl. 93—81)

The present invention relates to a machine for making fiber container or can bodies and has particular reference to devices for feeding prepared blanks bearing a dried adhesive, moistening the adhesive to produce a tacky condition and winding the moistened blanks into tight cylindrical can bodies in a manner which gives ample time for winding with a greater speed of production.

An object of the invention is the provision of a fiber can body making machine wherein prepared flat blanks are formed into finished can bodies by a plurality of can body winding devices receiving the blanks from a single source of supply, the winding devices operating simultaneously so that ample time is obtained for the individual rolling of the blanks into laminated body shape attendant with a high total rate of production.

Another object is the provision in such a machine of blank feeding devices wherein individual fiber blanks are fed from the bottom of a magazine so that the magazine may be kept filled from the top, the feeding devices operating to hold the blank next above the lowermost blank in place within the magazine while the lowermost blank is being withdrawn so that only one blank will be fed at a time.

Another object is the provision in a machine of this character, of devices for treating prepared blanks having a dried adhesive on a surface thereof so that the adhesive will be brought into a fresh tacky condition just prior to the blank being formed into a can body.

Another object is the provision in such a machine, of devices for guiding an adhesive bearing fiber blank into can body shape while creating a pressure effective on the formed walls of the body so that these fiber walls will be tightly bonded together by the tacky adhesive therebetween.

Numerous other objects and advantages of the invention will be apparent as it is better understood from the following description, which, taken in connection with the accompanying drawings, discloses a preferred embodiment thereof.

Referring to the drawings:

Fig. 3 is a top plan view of the machine shown in Fig. 1, with parts broken away;

Fig. 4 is an enlarged sectional view of the upper portion of the machine as taken substantially along the line 4—4 in Fig. 3;

Figure 1:
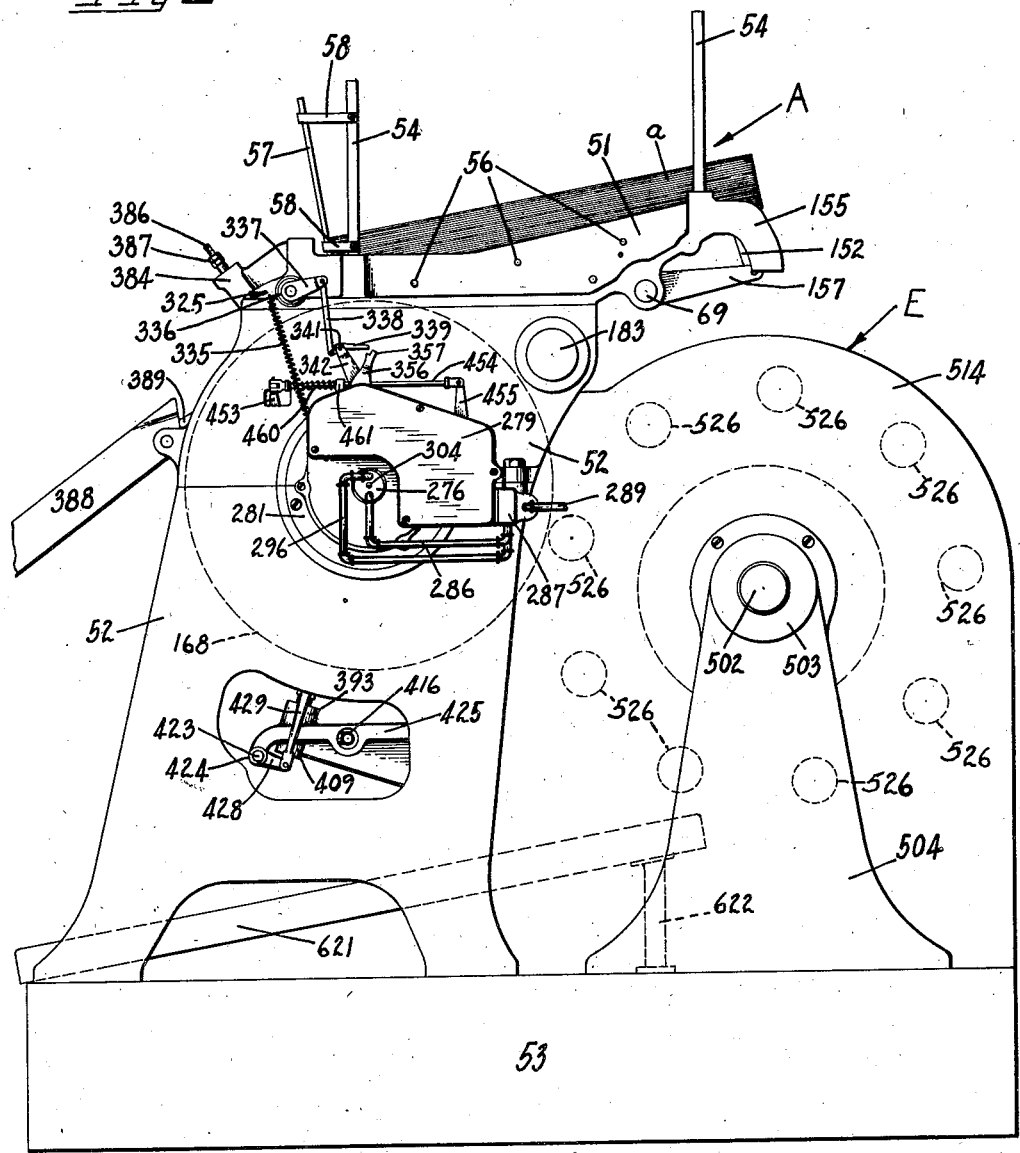
Figure 1 is a side elevation of a machine embodying the instant invention.
Figure 32:
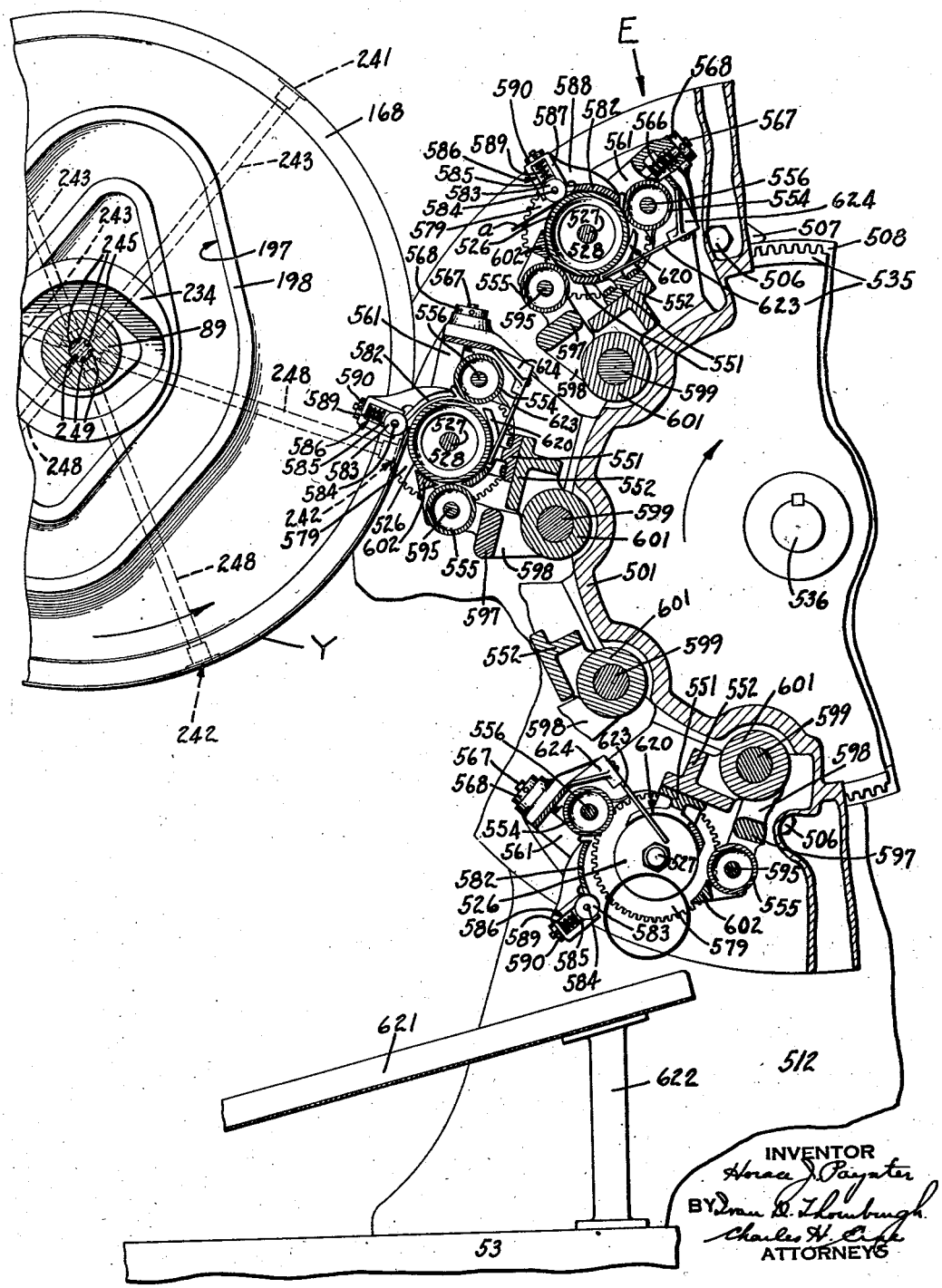

Figs. 5, 6 and 7 are enlarged sectional details of a valve mechanism illustrated at the left in Fig. 4, the sections being taken substantially along respective lines 5—5, 6—6 and 7—7 in Fig. 12;

Fig. 8 is an enlarged top plan view of a part of the blank feeding device located at the right in Fig. 3 with parts broken away, the view as compared with Fig. 3 being rotated through ninety degrees in a clockwise direction;

Figs. 9 and 10 are fragmentary sectional details taken substantially along the respective broken lines 9—9 and 10—10 in Fig. 8;

Fig. 11 is a view similar to Fig. 10 and showing additional parts together with the same movable parts in a different position;

Fig. 12 is an enlarged sectional detail taken substantially along the horizontal line 12—12 at the left in Fig. 4;

Fig. 13 is a transverse sectional view taken substantially along the line 13—13 in Fig. 4, with parts broken away;

Fig. 14 is a fragmentary top plan view taken substantially along a plane indicated by the broken line 14—14 in Fig. 13, with parts broken away;

Fig. 15 is a sectional detail taken substantially along the line 15—15 in Fig. 13;

Fig. 16 is a transverse section taken substantially along the line 16—16 in Fig. 4, parts being broken away;

Fig. 17 is a fragmentary end elevation of the parts illustrated at the right in Fig. 16, parts being broken away;

Fig. 18 is a sectional view taken substantially along the line 18—18 in Fig. 16 with parts shown in end elevation;

Fig. 19 is a sectional detail taken substantially along the broken line 19—19 in Fig. 18;

Fig. 20 is a perspective detail of certain parts illustrated at the lower right in Fig. 18, with parts broken away;

Fig. 21 is an enlarged composite end elevation and sectional view taken substantially along the line 21—21 in Fig. 3, parts being broken away;

Fig. 22 is a top plan sectional view taken substantially along the broken line 22—22 in Fig. 21, with parts broken away;

Figs. 23 and 24 are sectional details taken substantially along the respective lines 23—23 and 24—24 in Fig. 4;

Fig. 25 is an enlarged sectional view of a representative valve of which there are a number used throughout the machine, these being of identical construction;

Figs. 26 and 27 are top plan detail views taken substantially along a plane indicated by the line 26—26 in Fig. 16, the two views showing movable parts in different positions;

Fig. 28 is an enlarged fragmentary front elevation and sectional view of the blank winding mechanism located at the right in Fig. 1, the viewpoint indicated as being taken substantially along the line 28—28 in Fig. 34, with parts broken away;

Figs. 29, 30 and 31 are composite elevation and sectional views of one of the blank winding units, Fig. 29 being a side elevation and sectional view taken substantially along the line 29—29 in Fig. 28, Fig. 30 being a top plan view taken substantially along a plane indicated by the line 30—30 in Fig. 28, and Fig. 31 being a reverse side elevation and sectional view as taken substantially along the broken line 31—31 in Fig. 28;

Fig. 32 is an enlarged fragmentary and transverse sectional view taken substantially along the line 32—32 in Fig. 3, with parts broken away;

Figs. 33 and 34 when taken together illustrate an enlarged longitudinal section taken substantially along the broken line 33—33 in Fig. 3, parts being broken away;

Fig. 35 is a sectional detail taken substantially along the line 35—35 in Fig. 29;

Fig. 36 is a sectional detail of certain of the moving parts illustrated at the right in Fig. 34, and in a different position; and Figs. 37, 38 and 39 are sectional details taken substantially along the respective lines 37—37, 38—38, and 39—39 in Fig. 33.

Figure 2:
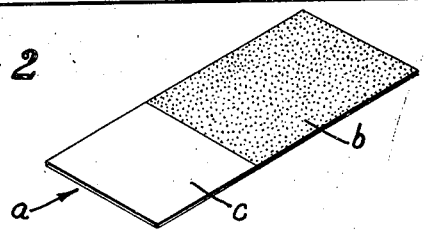
Fig. 2 is a perspective view of a prepared blank ready to be shaped into a can body.

In the machine disclosed in the drawings as a preferred embodiment of the instant invention, wound fiber can bodies of the laminated type are preferably made from previously prepared rectangular blanks $a$ illustrated in Fig. 2. One surface of the blank is in part coated with adhesive $b$ which is dry when the blanks are received for treatment in the machine. The uncoated portion of the blank (marked $c$) which is the portion adjacent the adhesive, will be the inside of the can body when the blank is fully wound into body shape. The adhesive will be intermediate the laminations of the finished body.

A stack of the blanks $a$ is supported in a magazine A (Figs. 1 and 11) from which they are individually withdrawn by a feeding device B, the blanks being fed from the bottom of the stack. A fed blank is immediately brought into engagement with a transfer unit C (Figs. 3 and 11) which carries the blank past an adhesive moistening device D (Figs. 16 and 18). Here the adhesive on the blank is brought into a tacky condition preparatory to forming the blank into body shape. Provision is also made for rendering the moistening device inoperative in case no blank is fed forward.

The moistened blank is carried further along its path of travel and is then transferred to a winding mechanism E (Figs. 1 and 32). In this mechanism one end of the blank is caught by one of a plurality of rotating spindles or mandrels and is tightly wound around the spindle while pressure is exerted on the outside of the blank. This pressure is retained on the blank for a sufficient time after it is formed into its can body shape to insure that the adhesive effects a tight bond between the laminations of the body walls. After thus winding the blank into body shape the still rotating spindle is withdrawn from inside each body and the latter is discharged to any suitable place of deposit.

The blank magazine A is located on top of the machine in an inclined position and includes a pair of spaced magazine side frames 51 (Figs. 1, 3, 4, 8 and 11) which are bolted to a pair of main machine side frames 52 mounted on a base 53. The magazine side frames 51 are provided with vertically disposed guide rods 54 which retain the blanks in a stack one on top of the other. The blanks are mainly supported on a plurality of rollers 55 which are mounted on cross-rods 56 carried in the magazine side frames. These rollers are arranged to retain the blanks in an inclined position so that they may be more readily withdrawn from the stack.

Adjacent the forward end of the magazine the blanks overhang the foremost supporting roller 55 and engage endwise against a stop plate 57 (see also Fig. 13) which is carried on arms 58 connecting with the forward guide rods 54. This stop plate prevents shifting of the blanks while they are in the magazine. At the rear or elevated end of the magazine the blanks rest on a cross plate 59 (Fig. 11), the ends of the blanks overhanging the plate. This plate is bolted to the magazine side frames 51.

Feeding of the blanks $a$ from the magazine A is preferably done by suction cups which are associated with the feeding device B, the device being located directly under the magazine. In this feeding operation provision is made for holding the remainder of the stack while the lowermost blank is withdrawn, the rear end of the lowermost blank being first drawn down over and below the rear end of the support plate 59, as shown in Fig. 10.

Drawing down of the rear end of the lowermost blank is effected by a pair of suction cups 61 (Figs. 8, 10 and 11) which are secured to a pivot block 62 having trunnions 63 carried in the magazine side frames 51. One of these trunnions extends beyond the side frame and carries an arm 65. The arm 65 is connected by a link 66 to a second arm 67 which is formed on a sleeve 68 loosely mounted on a cross shaft 69. The cross shaft is carried in bearings 71 formed in the magazine side frame and in a bearing 72 formed in a cam housing 73 secured to a side of one of the magazine side frames.

Sleeve 68 is provided with an arm 75 which carries a cam roller 76. The cam roller operates in a cam groove 77 formed in the inner face of a cam 78 mounted on a short shaft 79 journaled in bearings 81 formed in the cam housing 73. The outer end of the shaft projects beyond the housing and carries a sprocket 84 (see also Fig. 3) which is driven by a chain 85. Chain 85 in turn takes over a driving sprocket 86 (see also Fig. 4) bolted onto a hub extension 87 of a drum gear 88 carried on one end of a hollow drum shaft 89. This shaft is journaled in bearings 91 formed in the main side frames 52.

The drum gear 88 is continuously rotated by a meshing pinion 93 (Fig. 3) which is mounted on the inner end of a main driving shaft 95. The main driving shaft is journaled at one end in a bearing 96 formed in one of the main side frames 52 and at its opposite end in a pair of bearings 97 provided in a gear casing 98 secured to the base 53. This driving shaft is rotated in any suitable manner, such as for example, by means of a pulley 99 which is carried on the shaft.

Rotation of the main driving shaft 95 revolves the drum shaft 89 and the cam shaft 79 and hence rotates the cam 78 in time with the other moving parts of the machine. The rotation of the cam rocks the sleeve 68 and the suction head block 62 connected therewith. Thus the suction cups 61 are rotated upwardly into engagement with the rear end of the lowermost blank a in the magazine as an incident to feeding a blank.

A vacuum is drawn on the suction cups 61 when in this engaged position and the blank so engaged adheres to the cups. The pivoted block 62 is provided with channels 111 (Fig. 8) which connect into each suction cup 61. A manifold end of the channels extends through one of the projecting trunnions 63 where it opens into a similar channel 112 formed in the hub of the block actuating arm 65. The outer end of this channel 112 communicates with a flexible tube 113.

One end of the tube 113 is secured in the hub of the arm 65 while its opposite end is fastened into a valve cage 114 (Fig. 9) which is bolted onto the cam housing 73. The valve cage houses a valve 115 (see also Fig. 25) which is tightly threaded into a tapered bore 116 formed in the cage. The interior of the valve is hollowed out to provide a cylinder 117 which is open at one end, the lower end as viewed in Fig. 9. This end of the cylinder communicates with an atmosphere port 118 which is formed in the valve cage 114 and which leads to the outside atmosphere.

The side wall of the valve 115 is provided with radial intake ports 121 (Fig. 25) which communicates with the valve cylinder 117 and which lead outwardly into an annular groove 122 cut in the outside surface of the valve. Communication between this groove and the valve cage end of the flexible tube 113 is provided by a bore 123 which is formed in the cage.

The valve is also provided with radial outlet ports 125 which extend from the valve cylinder 117 into a second annular groove 126 formed in the outer peripheral surface of the valve. Grooves 122 and 126 are entirely cut off from communication with each other by the metal to metal contact of the outside surface of the valve with the surface of the cage around the tapered bore 116. However, the groove 126 communicates with an exhaust bore 128 which is formed in the valve cage and which connects with a pipe 129 threaded into the cage. This pipe 129 leads to any suitable source of vacuum such as a vacuum tank or a pump for creating a vacuum.

Control of the vacuum through the valve 115 is governed by a piston 132 (Fig. 25) which slides in the valve cylinder 117. The piston is carried on the inner end of a stem 133 which extends up through a bearing 134 formed in the upper end of the valve as viewed in Fig. 9. The outer end of the stem is connected by a link 136 to a bell crank lever 137 loosely mounted on a pin 138 secured in a boss 139 formed in the cam housing 73 (see Fig. 8). The bell crank lever is provided with two arms 141, 142 which respectively carry at their outer ends cam rollers 143, 144. Cam roller 143 operates on a narrow edge cam 146 while roller 144 operates on a similar cam 147. These cams are formed on a sleeve 148 mounted on and rotated by the cam shaft 79.

Thus as the cam shaft 79 revolves the cams 146, 147 they in turn rock the bell crank lever 137 in unison with the other moving parts of the machine and hence reciprocate the valve piston 132 within its cylinder 117 in the cycle desired. Rocking of the bell crank lever first moves the piston into a position between the intake ports 121 and the atmosphere port 118. Direct communication is thereby established between the source of vacuum and the suction cups 61.

A vacuum is therefore drawn on the suction cups by way of the block channels 111, block actuating arm channel 112, tube 113, valve cage bore 123, valve groove 122, intake ports 121, valve cylinder 117, outlet ports 125, valve groove 126, exhaust bore 128, and pipe 129. It is this vacuum that draws down the rear end of the lowermost blank a in the magazine when the cups move from the raised position of Fig. 11 into that of Fig. 10 as when the cup block 62 rocks.

At the proper time, as will be explained in due course, the cups will be released from the blank by breaking of the vacuum. This vacuum release is effected when the valve piston 132 is moved in a reverse direction by the cooperating cams 146, 147 and the bell crank 137. Reverse movement of the piston brings it into a position between the valve intake ports 121 and the outlet ports 125. This cuts off communication between the suction cups 61 and the source of vacuum.

At the same time there is established communication between the cups and the atmosphere port 118. Outside air rushes into the bores, tube, and channels and into the suction cups and this breaks the vacuum and releases the blank from the cups at the proper time.

Positive holding of the blank next above the lowermost blank a while the latter is held by the suction cups 61 is preferably effected by a series of three vacuum cups 151 (Figs. 8, 10 and 11). These vacuum cups are mounted on a movable cross beam 152 having cam rollers 153 secured to each end thereof. The cam rollers operate within grooves 154 of stationary cams 155 formed as a part of the magazine side frames 51.

The beam is secured to the outer ends of a pair of spaced arms 157 which are carried on the cross-shaft 69. The cross shaft also carries a cam arm 158 (Fig. 8) having a cam roller 159 which operates within a groove 161 formed in the outer face of the cam 78 mounted on the cam shaft 79.

Thus as the cross shaft 69 oscillates the cross beam 152 is raised and lowered and its vacuum cups 151 move toward and away from the stack of blanks in the magazine. On the upward stroke of the cross beam the stationary cams 155 guide the cups past the turned down rear end of the held lowermost blank and further guide the cups into engagement with the blank next above. It is at this time of engagement that the suction cups 61 release their hold on the turned down end of the lowermost blank and leave it free for withdrawal.

To get the proper vacuum control on the vacuum cups 151 they are properly connected to a source of vacuum. For this purpose each vacuum cup 151 is connected by a tube 163 into the valve cage 114 and these join and communicate with a valve which is identical in construction to the valve 115 just explained. This valve is located adjacent the valve 115 and is operated in a similar manner by a bell crank 165 (Fig. 8) mounted on the same pin 138 adjacent the bell crank lever 137. Bell crank 165 carries cam rollers which operate on a pair of adjacent edge cams 166, 167 also formed on the cam sleeve 148.

Withdrawal of the lowermost blank a from the magazine while the blank next above is held stationary is brought about by a single feed cup 171 (Figs. 4, 11, 13 and 14) which is located directly under the forward ends of the blanks in the magazine. In this location the feed cup is disposed between but is slightly above a pair of feed drum wheels 168, 169 carried on the drum shaft 89 and associated with the transfer unit C.

Feed cup 171 is carried on the free end of a substantially horizontal movable arm 172 which is a part of a parallelogram system of links (Figs. 13 and 14) arranged to guide the cup along a curved path of travel when the links are moved. The cup arm is supported on three inclined movable links 173, 174, 175 which are included in the parallelogram system. Links 173, 174 are mounted alongside each other, one on each side of the arm intermediate its length. The upper ends of these links are pivotally connected to the arm by a pivot pin 176. The upper end of the link 175 is pivotally connected by a pivot pin 177 to the outer end of the arm.

To complete the parallelogram system of links the lower ends of links 173, 174 are mounted on a pivot pin 178 carried in two spaced stationary support arms 179 one of which is straight, the other curved. These arms are formed integrally with a half block 181 which is formed with a V-groove and which is clamped by a half cap 182 around a locking portion 183 of a stationary bar 184. The ends of the bar are secured in the outside frame 52. The lower end of link 175 is fastened by a pivot pin 186 to the outer end of an arm 187 which is carried on the pivot pin 178 adjacent the outer stationary arm 178.

Thus the arms and links are all tied together in a parallel system and are moved along controlled paths of travel in order to shift the suction cup 171 in a controlled path as will now be explained. Link 175 and its arm 187 are rocked independently of the parallel arms 173, 174. For this purpose arm 187 is provided with a leg 188 which carries a cam roller 189. The roller operates in a cam groove 191 (see also Fig. 4) of a face cam 192 formed as a part of the feed drum wheel 169. Rotation of the drum wheel 169 and its cam 192 rocks the arm 187, link 175, and the feed cup arm 172 and moves the feed cup 171 vertically.

The horizontal movement of the feed cup 171 is effected by cam action through the medium of a cam roller 195 (Figs. 13 and 14) which is carried on a lug extension 196 of the link 174. The cam roller operates in a cam groove 197 (see Fig. 4) of a face cam 198 formed as a part of the feed drum wheel 168. Rotation of the cam rocks the links 173, 174 and thus shifts the feed cup arm 172 moving the feed cup 171 in its horizontal direction.

The combination sequence of these vertical and horizontal movements first shifts the feed cup 171 vertically into engagement with the forward end of the lowermost blank a in the magazine. A vacuum is drawn on the cup at that time. The feed cup then moves downwardly and forwardly in a curved path of travel in time with the rotation of the feed drum wheels and corresponding somewhat to the surface of the drums.

The result of this movement is to partially withdraw the blank a from the magazine and to bring the forward end of the blank down into engagement with the periphery of the two spaced and parallel feed drum wheels of the transfer unit C. The feed cup then releases the blank as the vacuum is broken. The feed cup returns to its original raised position ready to transfer the next succeeding blank but not until the partially withdrawn lowermost blank has been entirely removed from the magazine.

The vacuum control on the feed cup 171 is effected through a valve 211 (Fig. 13) which is identical in construction with the other valves 115 (Fig. 25) hereinbefore described. This valve 211 is housed in a valve casing 212 bolted onto a bracket 213 (see also Fig. 15) which is secured to one of the support arms 179.

The vacuum supply connection with the valve 211 is made by a flexible tube 215 one end connecting to the feed cup arm 172, the other end being secured in the valve cage 212 where its interior communicates with a short passageway 216 formed in the cage which leads to the narrow groove of the valve. The feed arm 172 has a passageway 217 which connects the flexible tube to the feed cup 171.

A vacuum supply pipe 218 is threaded into the valve cage, and its interior communicates with a passageway 219 formed in the cage which leads to the wide groove of the valve. An atmosphere port 221 is formed in the valve cage for letting air into the feed cup to break the vacuum.

The movable piston of the valve 211 is actuated by a stem 225 which is connected by a link 226 to the lower end of a vertically disposed lever 227. The lever is mounted on a pivot pin 228 carried in a bracket 229 formed on the valve cage 212. The upper end of the lever carries a cam roller 232 which operates in a cam groove 233 cut in one face of a cam 234 mounted on the drum shaft 89 adjacent the drum wheel 168 (see also Fig. 4). This provides cam actuation for the valve.

When the forward end of a blank a partially removed from the magazine is brought into engagement with the outer surface of the feed drum wheels 168, 169 of the transfer unit C it is held there by suction cups which are provided in the drum wheels. Hence the moving wheels withdraw the blank completely from the magazine.

The drum wheels are preferably of sufficient diameter to accommodate on their circumferences two blanks in end to end relation with a working space between them. Greater speed of production is thus possible since one blank is being worked on while another succeeding blank is being positioned on the drum wheels in readiness for working. For simplicity of explanation of operation the first of the blanks on the drum wheels will be designated as blank Y and the following as blank X.

There are preferably two identical sets of suction cups in each drum wheel. One set designated by the numeral 241 (Fig. 4) holds blank X on the drum wheels while the second set, marked 242 (see Fig. 32) holds blank Y in place. The drawings illustrate three cups in each set thus making a total of six cups spaced around the circumference of the two drum wheels.

The first cup in each set is the one which grips the forward end of the blank and holds it in position on the drum wheels. The other two cups of each set are spaced so that the blank will be gripped intermediate its ends and then at its tail and thereby positively holding the blank tight against the outer surface of the drums as it is withdrawn from the magazine. It is for this purpose that the feed drum unit is rotated in time to properly receive the front end of the blank as it is separated from the magazine.

A vacuum is drawn on the suction cups 241, 242 at the proper time through certain pipes and passageways leading to a suitable source of supply of vacuum and is controlled by a dual valve mechanism serving both sets of suction cups and operated in time with the other moving parts of the machine. These will now be explained.

Suction cups 241 are connected to the outer ends of radial pipes 243 (Fig. 4) which lead into a central bore 244 formed in the drum shaft 89. These pipes communicate with flutes 245 (see also Figs. 5, 6 and 7) formed on half of the peripheral surface of a core 246 disposed in the bore 244 and keyed in the drum shaft 89. In a similar manner the suction cups 242 are connected to the outer ends of radial pipes 248 (Figs. 13 and 32) which lead into the drum shaft bore 244 and there communicate with flutes 249 formed on the other side of the core 246.

Drawing of a vacuum and breaking of the vacuum at the suction cups through these flutes is controlled by valves 255, 256 (Figs. 5 and 12) which are carried in a valve housing 257 mounted on a tapered end 258 of the drum shaft 89. The valve housing is held in place by a nut 259 which is threaded onto the outer end of the shaft. The valve housing therefore rotates with the shaft.

There are three valves 255 and three valves 256, one valve 255 for each of the flutes 245 and one valve 256 for each of the flutes 249. Valves 255 are arranged in a row in one side of the housing and valves 256 are similarly arranged in the opposite side of the housing. These valves are identical in construction and operation to the valves 115 illustrated in Fig. 25 and therefore no further detailed description of them need be given.

Each valve 255 is connected with its particular flute 245 by a passageway 262 which is formed in the valve housing and which leads into a hole 263 formed in the tapered end of the drum shaft 89. Each hole 263 therefore communicates with its associated flute 245. In a similar manner each valve 256 is connected with its particular flute 249 by a passageway 265 formed in the valve housing and leading into a hole 266 in the drum shaft 89, each such hole being in communication with its flute 249.

The inner or closed ends of the valves 255, 256 are constantly in communication with a source of vacuum supply and their outer or open ends are in the outside atmosphere. The valves 256 will first be considered.

The closed ends of these three valves 256 are connected with each other by a passageway 271 (Figs. 5, 12 and 24) which is formed in the valve housing and one end of the passageway leads into a channel 272 formed in a plate 273 bolted to the end of the rotating valve housing 257. Channel 272 communicates at all times with an annular groove 275 which is formed in an adjacent end of a non-rotating spring held block 276. A gasket 277 is interposed between the block and the plate 273 to provide an airtight joint.

Block 276 has a slight movement in its support in a bearing 278 formed in a cylindrical hollow stationary bracket 279 which is secured to a tubular cam shell 281. The cam shell surrounds the valve housing and is secured to the outside of the side frame 52. The block is forcibly held against the end of the rotating plate 273 by a plurality of spaced spring barrels 282 which are backed up by compression springs 283 retained in bores 284 formed in the block.

The annular groove 275 in the block 276 also communicates with a passageway 285 which is formed in the block and which leads to an inlet pipe 286 one end of which is threaded in the outer end of the block. The other end of the pipe is threaded into a valve cage 287 (see Fig. 21) which is bolted onto the bracket 279. This end of the pipe communicates with a cut-off valve 288 (Fig. 22) which is associated with the suction cups 242 and which will be referred to again.

This valve is identical with the valve 115 shown in Fig. 25. The valve 288 is also in communication with a main vacuum pipe 289 (Fig. 21) which is threaded into the valve cage. This vacuum pipe leads to any suitable source of supply of vacuum such as for example, a vacuum pump or a vacuum tank.

In a similar manner the closed ends of the valves 255 are connected together by a passageway 291 (Fig. 5) one end of which leads into a channel 292 (Fig. 24) formed in the plate 273. The outer end of the channel communicates with an annular groove 293 (see also Fig. 12) which is formed in the inner end of the block 276 concentrically with and outside of the groove 275. Groove 293 also communicates with a passageway 295 (Fig. 4) which is provided in the block 276 and which leads into a vacuum inlet pipe 296 one end of which is threaded into the outer end of the block. The other end of the pipe is threaded into the valve cage 287 (Fig. 21) and there communicates with a cut off valve 297 (Fig. 22) located adjacent the valve 288. Valve 297 is associated with the suction cups 241 and is in constant communication with the vacuum pipe 289.

Thus as the valve plate 273 revolves, the connection is maintained between each of the channels 272, 292 and the respective grooves 275, 293. Whether or not vacuum is effective on the suction cups 241, 242 by way of the valves 255, 256 depends on the open or closed condition of the associated valves 288, 297 which in their turn depend upon the presence or absence of the sheets X and Y upon the drum wheels 168, 169.

The outside atmosphere is brought as far as the valves 255, 256 by means of channels 301, 302 (Figs. 5 and 12) which connect the open ends of the individual valves in each of the respective valves 255, 256 and one end of each channel is connected into a single passageway 303 (see also Fig. 24) which is formed in the plate 273. Such a passageway in the rotating plate is at all times aligned with an atmosphere port 304 provided in the stationary block 276. Port 304 opens to the outside atmosphere.

The valves 255, 256 are alternately opened and closed in time with the other moving parts of the machine. This is effected by cam levers 306 (Figs. 4 and 23) which are loosely mounted intermediate their length three on each of two pivot pins 307 carried in lugs 308 formed on the valve housing 257. There is one lever for each valve and one end of each lever is connected to the movable stem of the valve.

The valve stem end of the lever carries a cam roller 311 which operates against a ridge constituting an internal edge cam 312 formed on the inside of the tubular cam shell 281. The opposite end of the lever 306 carries a cam roller 313 which operates on a similar cam ridge 314 (Fig. 4) formed inside the cam shell adjacent the cam 312. The same cams 312, 314 serve one valve 255 and one valve 256. There are thus three double sets of levers 306 and three single sets of cams 312, 314 for the two valves 255 and 256.

In case no blank *a* is fed from the magazine when the suction cups 241 or 242 come into place to receive it, provision is made for cutting off vacuum from that particular set of suction cups passing the magazine. If the suction cups 241 are in such position the valve 297 closes to block the vacuum connection. If suction cups 242 are coming into place valve 288 is actuated for the same purpose.

This is accomplished by a blank detector unit 325 (Figs. 3, 13 and 21) which includes an idler detector roller 326 which rides on the outer surface of the drum wheel 169 if there is no blank on the wheel at the time. The roller is mounted on an arm 327 secured to the inner end of a pivot shaft 328 carried in a bearing 329 formed in one of the magazine side frames 51 and in a bearing 330 formed in a side bracket 331 which is secured to the magazine side frames. An inclined foot member 332 formed integrally with the brackets 331 extends down adjacent the detector roller 326 to guide the forward edge of a blank a under the roller when a blank is withdrawn from the magazine.

The detector roller 326 is maintained in riding position on the drum wheel surface or on a blank if there is a blank passing the roller, by a tension spring 335 which at one end is secured to the outer surface of the valve cam shell 281. The other end of the spring is secured to a pin 336 which is threaded into one end of an arm 337 carried on the outer end of the pivot shaft 328.

The opposite end of the arm is fastened to an inclined link 338 which at its lower end is connected to a latch finger 339. The outer end of the finger is free. Intermediate its length the latch finger is mounted on a pivot pin 341 which is secured in the upper end of a movable arm 342 (see also Fig. 4). This arm is secured to a horizontal shaft 343 mounted in a sleeve 344 carried in a bearing 345 formed in the cam bracket 279.

Each blank withdrawn from the magazine and pulled down on the drum wheels 168, 169 by the suction cups 241, 242, rides under the detector roller 326. This lifts the roller a distance equal to the thickness of the blank and rocks the arms 327, 337 and hence through the link 338 raises the free end of the finger 339 (Fig. 21) into its unlatching position.

Since the roller remains in engagement with the surface of the drum wheel unless lifted by a blank, when there is no blank the arms 327, 337 remain stationary and the free end of the latch finger is down and in a latching position. In this latching position the finger is effective to close off either valve 288, if the cups 242 are involved, or valve 297 if the suction cups 241 are passing adjacent the blank magazine.

The vacuum cut off for the suction cups results from a longitudinal shifting of the latch finger 339 with the arm 342. Arm 342 is rocked twice under cam action for each rotation of the drum wheels 168, 169. The outer end of the horizontal shaft 343 (Fig. 4) is provided with a cam arm 347 which carries a cam roller 348 (Figs. 21 and 22). The cam roller operates on a cam ridge 349 formed on a tubular compound cam member 351. This tubular cam member is formed with five cam ridges all of which will be described in their proper place. The cam ridge 349 is in the center of this compound cam system.

The tubular compound cam member 351 is secured to the outer face of the channel plate 273 and these parts therefore rotate as a unit with the shaft 89. A spring barrel 352 disposed in a boss 353 formed on the cam arm 347 presses against a lug 354 formed inside the bracket 279 and this keeps the cam roller in engagement with its cam.

The latch finger 339 in its latching position coacts with a normally stationary arm 356 (Figs. 4, 21 and 22) when it is moved by the cam shifted arm 342. Arm 356 is mounted on the sleeve 344 adjacent the movable arm 342 and its upper end extends up adjacent and in the path of the free end of the latch finger when the latter is in latching position. The arm 356 at its upper end is provided with a notch 357 for engaging in the latch finger when it swings over toward the right as viewing Fig. 21 and such latched engagement effects rocking of the arm 356 with the sleeve 344.

Rocking of the arm 356 and its sleeve actuates a train of cam operated levers which are connected with the vacuum valves 288, 297 (Fig. 22) hereinbefore mentioned. For this purpose the outer end of the sleeve 344 is provided with an arm 361 (Figs. 21 and 22) which carries a yoke 362 mounted intermediate its ends on a pivot stud 363 threaded into the end of the arm. The ends of the yoke rest on the inner legs of a pair of substantially horizontal levers 365 which are mounted side by side on a pivot pin 366 secured in the cam bracket 279.

The inner legs of the two levers 365 carry two cam rollers 367 (see also Fig. 4) which operate on two return cam ridges 368 of the tubular compound cam member 351. One of these cam ridges is on the outside or end of the cam member, the other is just back of the center cam ridge 349. The outer legs of the levers 365 are free. One of the cam ridges 368 is provided with low spots these being in axial position to correspond to the axial position of the suction cups 241, and low spots on the other cam ridge are positioned to time in with the travel of the suction cups 242.

Accordingly when the rocker arm 356 moves over and presses the yoke down against both horizontal levers only one of the levers 365 can move, this being the one that has its cam roller over the low spot in its cam. This results in a raising of the free end of that particular lever 365 which in turn shuts off the vacuum on the valve for that particular set of suction cups.

The free ends of the two levers 365, when not in a raised position, engage against the free ends of the upper legs of a pair of vertically disposed levers 371 which are mounted side by side on a pivot pin 372 secured in the cam bracket 279. The upper legs of the vertical levers 371 carry cam rollers 373 which operate on return ridge cams 374 (Fig. 22) of the tubular compound cam member 351. These return ridge cams like the cams 368 have low spots, the position of which bear a definite relation to the suction cups 241, 242. There is one return ridge cam for cups 241 and one for cups 242. One return ridge cam 374 is at the back of the compound cam member, the other cam 374 is in between the cams 349 and 368.

The lower legs of the vertical levers 371 are connected to tension springs 375 which are secured to pins 376 held in the bracket 279. These springs tend to hold the free ends of the vertical levers 371 in their engagement with the free ends of the horizontal levers 365. The lower leg of each vertical lever 371 is also connected by a link 378 to either one or the other of the vacuum cut-off valves 288, 297.

Hence when the free end of one of the horizontal levers 365 is raised it rides off of and thereby releases the free end of its corresponding vertical lever 371. When so released, the low spot on its corresponding cam 374 permits the tension spring 375 connected with this lever to drop its cam roller 373 down into the low spot. This rocks the lever 371.

As the lever moves, the vacuum cut-off valve 288 or 297 which ever is connected with that particular lever, thereupon cuts off the vacuum from the main supply pipe 269. Hence vacuum is not drawn on the associated set of suction cups which are then in place to receive a blank if there was one to be received. Thus it will be evident how vacuum is maintained on the suction cups 241, 242 as long only as there are blanks to be held in place on the drum wheels.

If more than one blank a is fed from the magazine at one time the suction cups 241 or 242 will hold only the lowermost blank on the drum wheels and the surplus blank or blanks will be discarded. Discarding of the excess blanks is effected by a pair of rollers 381 (Fig. 13) which frictionally roll on the outer surfaces of the drum wheels 168, 169 or on blanks carried thereby and are adjacent the blank detector roller 325.

Each roller 381 is mounted in a slide block 382 carried in a slide 383 formed in a bracket 384 attached to the magazine side frames 51. The slide block is backed up by a compression spring 385 which surrounds a rod 386 secured in the block. This spring presses the rollers toward the drum wheels. The rod extends up through the bracket and is provided with lock nuts 387 for adjusting the pressure exerted by the spring 385 on the rollers.

Hence when there is one or more excess blanks to pass under the roller 382, the blank or blanks not held on the drum wheels by the suction cups are curled outwardly at a tangent to the surface of the drum wheels and this frees them from the wheels. Such blanks fall into a discharge chute 388 secured to the machine side frames 52 and are thereupon discarded to any suitable place of deposit. A guide shoe 389 mounted at the mouth of the chute directs the loose blanks away from the drum wheel surfaces and guides them into the chute.

A blank a held in place on the drum wheels by its suction cups is disposed with its adhesive covered surface facing outwardly and in this position is carried down toward the bottom of the wheels as they rotate and into the region of the moistening device D (Figs. 16, 18 and 19) hereinbefore mentioned which renders the adhesive tacky. This moistening device includes a manifold 393 which is formed on a bracket 394 bolted to a tie beam 395 secured to the main side frames 52. The manifold is located directly under the drum wheels 168, 169 adjacent to and just below the outer surfaces of the wheels so that a blank held on the wheels will pass over the manifold.

The manifold sprays the passing blank with a vapor of condensed steam. For this purpose the upper surface of the manifold is provided with a transverse slot 397 which extends down into a cylindrical steam chamber 398 formed within the manifold. Inside the chamber there is disposed a double walled condensation tube 399 through which a cooling medium, such as cold water or the like, is circulated by way of an inlet pipe 401 and an outlet pipe 402. These pipes lead from and to any suitable source of the cooling medium.

The inlet pipe 401 communicates with the space between the double walls of the tube and hence admits the cooling medium into this space where it is adjacent the outer surface of the tube. After circulating through this space it enters into the inner tube by way of holes 403 formed in the inner tube and hence is carried off by the outlet pipe 402 which communicates with the inner tube.

Steam is admitted into the steam chamber 398 by way of channels 406 which are formed in the manifold. These channels communicate with an inner port 407 which is periodically opened and closed by a valve 408 located in a valve housing 409 formed on the manifold. The valve is disposed in a bore 411 in the housing and engages against a valve seat 412 provided adjacent and surrounding the port 407.

The valve is normally held against its seat by a compression spring 413 which is supported on a stuffing box nut 414 threaded into the end of the valve housing. The valve is also provided with an actuating stem 415 which extends through and projects beyond the stuffing box nut 414. The bore 411 in the valve housing is in communication with a steam inlet pipe 416 which connects with any suitable source of supply of steam. Hence steam from the inlet pipe is constantly supplied to the valve bore 411.

When the valve 408 is opened steam from the bore 411 flows out through the port 407 and passes up through the channels 406 into the steam chamber 398 where it surrounds and comes in contact with the cold condensing tube 399. This condenses the steam into a water vapor which is driven out as fast as formed by the incoming steam, escaping from the manifold slot 397 as a fine vapor spray. It is this spray which strikes against the moving blank and converts the dried adhesive into a tacky condition.

It should be here noted that the condensation tube 399, as shown in Fig. 19, is very near the inner end of the slot 397 so that the entrance to the slot is somewhat restricted. This insures that only condensed steam in the form of a water or saturated vapor issues from the slot and also acts to prevent the live steam from escaping.

Opening and closing of the steam valve 408 is effected in time with the rotation of the drum wheels 168, 169 so that the water vapor will be discharged only at the time a blank is moving past the manifold 393. For this purpose the lower end of the valve stem 415 is provided with a collar 421 (see also Fig. 20) which is engaged by the bifurcated end of an arm 422 mounted on one end of a rocker shaft 423 carried in a bearing 424 formed in an extension 425 of the manifold bracket 394.

The opposite end of the rocker shaft 423 carries an arm 428 which is connected to the lower end of an inclined slide link 429 (Fig. 16). Adjacent its upper end the link slides in a grooved boss having an overcap 431 and formed on a slide bracket 432 bolted to one of the main side frames 52. The upper end of the link carries a cam roller 433 which is operated on by a pair of wing cams 434 carried on a hub 435 keyed onto the drum wheel shaft 89 (see also Fig. 4). The cams thus rotate with the drum shaft.

Since there are normally two blanks X and Y on the drum wheels at one time there are two of the cams 434 disposed on opposite sides of the hub 435 being located in definite relation to the suction cups 241, 242. The cams are hinged to the hub by pivot pins 437 which extend through cam lugs 438 and are movable against the resistance of a compression spring 439. This provides for failure in blank feeding as will be hereinafter explained.

When the rotating drum wheels bring a blank X and Y adjacent the moistening device, one of the cams 434 engages the cam roller 433, and depresses the slide link 429 which opens the valve 408. The extended cam surface holds the valve open until the blank passes the discharge slot 391 and then the cam surface terminates and frees the roller 433. Accordingly the spring 413 within the valve housing closes the valve.

Consideration will now be given for rendering the moistening device inoperative when there is no blank X or Y on the drum wheels, so that the vapor will not be deposited on the wheels. For this purpose there is provided a cam lever 445 (Figs. 4, 16, 17, 21, 26 and 27) which is mounted on a vertical pivot shaft 446 carried in lugs 447 formed on the side frame 52 adjacent the cams 434. The cam lever is provided with an arm 448 which extends adjacent the cams 434 and carries on its free end a button 449. In one position of the cam lever, the button 449 is in the path of travel of auxiliary cam surfaces 451 formed on the inner surfaces of the cams.

The cam lever 445 is also provided with an arm 453 which is connected by a horizontal link rod 454 to a lever arm 455 (see also Fig. 22) mounted on a rock shaft 456 carried in a bearing 457 formed on the bracket 279. Inside the bracket the rock shaft is integral with a lever arm 458 having at its free end a broad shoe 459 which rests on the free ends of both of the blank detector levers 365. The shoe is normally held in this engagement by a compression spring 460 (Fig. 21) which is coiled around the link rod 454 and is interposed between the end of the cam lever arm 453 and a lug 461, the latter being formed on the bracket 279.

Accordingly whenever the free end of one or the other of the blank detector arms 365 is raised to cut off the vacuum from the set of suction cups 241 or 242 which it controls when no blank is fed onto the drum wheels, the arm shoe 459 is also raised by the actuated arm 365 and hence the arms 458 and 455 are rocked. This rocks the cam lever 445 and thus moves the button 449 on the end of the lever arm 448 into the path of the auxiliary cams 451 on the cams 434. Thus as the associated cam 434 rotates into position to bring its cam surface 451 against the button 449 the latter pushes the cam 434 sidewise, swinging it on its pivot pins 437. This shifts the cam 434 rom its normal position, as shown in Fig. 26, into the angularly disposed position shown in Fig. 27.

The shifted cam 434 is maintained in this non-operative, angular position during its rotation long enough to clear blank space of the drum wheels and to move the space past the moistening device. This is effected by a holding roller 465 (Figs. 16, 17, 26 and 27) which is carried on one leg of a bell crank lever 466 mounted on a pin 467 secured in the slide bracket 432.

The other arm of the bell crank lever is connected to a spring rod 468 guided in a swivel block 469 carried in a lug 470 formed on the slide bracket. The rod is surrounded by a compression spring 471 which is interposed between the bell crank arm and the block 469. The spring holds the roller 465 in a position adjacent the cams 434 and lock nuts 472 on the spring rod limit the movement of the roller.

As long as normal conditions prevail and there is a blank X or Y on the drum wheels, the corresponding cam surface of the cam 434 rides against the roller 465 depressing it. Obviously when a cam 434 is shifted sidewise as in a blank feeding failure, such a cam passes alongside of the roller which engaging the inner flat side of the cam, retains this shifted non-operative position. Such a cam therefore passes to one side of the slide roller 433 without depressing it and accordingly the steam valve 408 remains closed.

When the rotating cam rides off the holding roller 465, it still is maintained in its shifted position this time by the slide roller 433 the side of which engages the cam before the latter leaves the holding roller. The cam does not return to its normal operative position until it has cleared the slide roller. It is then returned by the compression spring 439.

During a normal spraying operation of the blank by the water vapor from the moistening device a portion of the drum wheel surface is unavoidably moistened. This condition is remedied by drying elements 475 (Figs. 8 and 11), arranged adjacent the drum wheels which wipe off the moisture and dry the wheel surfaces so that the subsequent blanks fed thereto may be kept dry.

There is one drying element 475 for each drum wheel 168, 169 and these include hollow drying heads 476 each head being open on the drum wheel side but covered or encased by a layer of fibrous absorbent material 477, such as felt or the like. The head is formed with a hollow stem 478 which carries a large lock nut 479 adapted to be turned down tightly against a clamp plate 480 for clamping the fibrous material in place around the head. The hollow stem is connected with a vacuum pipe 481 which leads to a suitable source of vacuum supply. The vacuum is continuously drawn on the interior of the head 476 and consequently a continuous stream of air passes from atmosphere through the absorbent material and into the head thus entraining any moisture in the absorbent material.

The drying elements 475 normally ride on the outer surfaces of the drum wheels 168, 169. However, between the blank spaces on the wheels which are the surfaces requiring wiping these drying elements are raised off the drum wheels to better permit the air to be drawn through them. For this purpose the elements are carried on the inner ends of a pair of spaced levers 483 which are mounted on a sleeve 484 surrounding a cross rod 485.

The rod is suspended across the main side frames 52 parallel with and adjacent to the rock shaft 69 of the blank feeding mechanism. The sleeve 484 also carries a kicker arm 486 disposed between the levers 483. The outer end of this arm extends into the path of travel of a setscrew 487 secured in a lug 488 formed on a collar 489 carried on the rock shaft 69.

Hence every time the rock shaft 69 rocks on its forward stroke, the setscrew 487 strikes the kicker arm 486 and hence rocks the sleeve 484. This raises the outer ends of the levers 483 and lifts the drying elements 475 free of the drum wheels. The drying elements return by their own weight when the rock shaft 69 again rocks in the reverse direction.

After the blank a has been moistened it is carried by the transfer drum wheels 168, 169 upwardly toward the body forming or winding mechanism E (Fig. 32) to which the blank is transferred and where it is rolled into a cylindrical can body. This mechanism is located adjacent the transfer drum wheels and includes a large drum cylinder 501 which is rotatable on a horizontal axis (see also Figs. 33 and 34).

At its outer end the cylinder is mounted on a trunnion 502 carried in a bearing 503 formed in a frame stand 504 (see also Fig. 1) secured to the base plate 53. At its inner end the cylinder is secured by bolts 506 (Figs. 32, 33 and 37) to spaced lugs 507 formed on a cylindrical extension 508. This extension is keyed onto a hollow trunnion 509 carried in a bearing 511 formed in an enclosed frame stand 512 secured to the base plate 53. The cylinder and its extension are enclosed by a cover plate 514.

Cylinder 501 and its extension 508 are rotated in time with the drum wheels 168, 169. To effect this the hollow trunnion 509 at its outer end carries a spur gear 518 which meshes with an idler pinion 519 (Fig. 3) mounted on an idler shaft 521 carried in suitable bearings formed in the enclosed frame stand 512. Pinion 519 is formed integrally with an idler gear 522 which meshes with a driving pinion 523 mounted on and rotated by the main drive shaft 95. The drum cylinder 501 is thus rotated in a clockwise direction as viewed in Fig. 32.

The cylinder 501 carries a plurality of rotatable winding spindles 526 (Figs. 32 and 34) which receive the blanks a from the drum wheels 168, 169 as the latter rotate. There are preferably nine of these winding spindles or units spaced peripherally around the drum cylinder and disposed so that they are moved past the outer surface of the drum wheels in close proximity thereto. The cylinder rotates much slower than the drum wheels, since there are nine spindles on the turret and only two blanks on the wheels, but the rotation of the parts is in such synchronism that every time a blank is brought into proper position by the cylinder there will be a winding spindle there ready to receive it. Each spindle receives one blank during a single revolution of the cylinder, provided there is a blank ready for transfer.

Each spindle 526 is keyed onto and is secured by a bolt 527 to an outer shouldered end 528 of a tubular shell 529 which is disposed within and keyed to a long sleeve 531. The sleeve is carried in bearings 532 formed on the cylinder 501. Adjacent the inner bearing 532 each sleeve 531 is provided with a gear 534 (Figs. 3, 33 and 37).

The nine gears (one for each spindle) mesh with a centrally located master driving gear 535 which is carried on the inner end of a horizontal shaft 536. Shaft 536 is extended through the hollow trunnion 509 of the cylinder extension 508. The shaft is journaled in a bearing 537 formed in the extension and also in a bearing 538 formed in the hollow trunnion adjacent its outer end.

The outer end of the horizontal shaft 536 carries a gear 539 which meshes with an intermediate gear 541 (Fig. 3) mounted on a stud 542 secured in a boss 543 formed on the enclosed frame stand 512. The intermediate gear meshes with the idler gear 522 and hence rotates the gear 539, shaft 536, master gear 535 and spindle sleeve gears 534 in time with the rotation of the cylinder.

Each winding spindle 526 is surrounded by a plurality of blank guides and rollers which facilitate starting the winding of the blank on the spindle and which continue its winding tightly into a compact can body as the spindle continues to rotate. For this purpose there is provided for each spindle a stationary arcuate guide 551 (Figs. 29, 32 and 34) which extends the full length of the spindle and which is bolted to a bracket 552 secured to the outer surface of the cylinder 501. This guide is curved in cross section and is disposed in close proximity to the outer surface of the spindle.

Pressure rollers 554 and 555 (see also Figs. 30 and 32) are located adjacent the blank inlet and outlet edges of the stationary guide at each winding unit. These rollers are pressed down tightly toward the associated spindle. Pressure roller 554 is mounted on a shaft 556 journaled in bearings 557 formed in slides 558. These slides are located at the ends of the shaft and are disposed in slideways 559 formed in a movable bracket 561. The bracket is provided with lugs 562 which carry pivot pins 563 mounted in bearings 564 formed on the stationary bracket 552.

The pressure roller 554 is yieldably forced toward the outer surface of the spindle 526 by compression springs 566 which are disposed behind the slides 558 in the slideways 559. The springs are coiled around rods 567 which are secured in the ends of the slides and which extend through holes in the bracket at the end of the slideways. Beyond the bracket the rod carries a stop collar 568 which limits the movement of the slide.

The pressure roller 554 is positively rotated in time with the spindle 526. This rotation is effected by a gear 571 (Figs. 29 and 35) which is mounted on the roller shaft 556. The gear meshes with an idler gear 572 mounted on the pivot pin 563.

A second idler gear 573 formed integrally with idler gear 572 meshes with an auxiliary idler gear 574 mounted on a pin 576 carried in suitable bearings formed in the bracket 552. This auxiliary idler gear 574 (see also Fig. 34) is formed integrally with a driven gear 578 which meshes with a gear 579 keyed onto the inner end of the spindle sleeve 531. Hence rotation of the sleeve drives the pressure roller through the gear train just described.

Adjacent the pressure roller 554, the bracket 561 is formed with a curved guide portion 582 (Figs. 30 and 32) which extends in proximity to but spaced from the outer surface of the spindle. This guide portion supports a blank guide roller 583 (see also Fig. 28) having trunnions 584 which are supported in slide blocks 585 disposed in slideways 586 formed in vertical bosses 587 integrally connected with the guide portion 582 by ribs 588. The guide blocks are backed up by compression springs 589 which are coiled around pins secured in the blocks. The pins extend up through the top of the bosses and carry stop collars 590 which limit the travel of the slide blocks. The springs normally hold the roller 583 against the rotating spindle or against the blank being wound thereon.

Pressure roller 555 disposed adjacent the outlet edge of the stationary guide 551 in each winding unit frictionally engages against the spindle 526. This roller is supported on a shaft 595 (Figs. 30, 31 and 32) carried in bearings 596 formed in a bracket 597 having a latterly extended leg 598 which is secured to the inner end of a rock shaft 599. The rock shaft is supported in spaced bearings 601 formed on the guide bracket 551.

Adjacent the pressure roller 555 and disposed parallel therewith, a blank guide edge 602 is formed on the roller bracket 597. The guide is located between the pressure roller 555 and the blank guide roller 583. This guide completes a net work of guide elements and pressure members which surrounds the spindle and provides a spindle unit which facilitates wrapping a blank received thereon into can body shape.

When one of these winding spindle units comes adjacent the transfer drum wheels 168, 169 to receive a moistened blank therefrom, the blank guide roller 583 and the pressure roller 554 are lifted away from the spindle thereby providing an open space in the guide network. This facilitates starting the end of the blank into winding position on the spindle. This lifting of the rollers is accompanied by a rocking of the roller bracket 561 on its pivot pins 563.

The bracket 561 is rocked by a yoke 611 (Figs. 28, 29 and 30) which is secured to the outer pivot pin 563 and which is connected by a link 612 to one end of a cam lever 613. The lever is mounted on a pivot stud 614 secured in the end of the cylinder 501. As its opposite end, the lever carries a cam roller 615 which operates in a cam groove 616 formed in the inner face of a stationary cam 617 (see Fig. 34) bolted to the hub 503 of the frame stand 504.

Thus while the cylinder rotates in the direction of the arrow shown in Fig. 32, bringing a spindle unit adjacent the drum wheels 168, 169, the cam roller 615 travels around the groove 616 and at the proper time rocks the cam lever 613, the link 612, the yoke 611 and hence slightly raises the pressure roller bracket 561.

When a spindle unit comes into blank receiving position relative to the drum wheels 168, 169, the forward end of a blank held on the drum wheels is adjacent the spindle 526 of the spindle unit. It is in this position that the vacuum is broken in the first suction cup 241 or 242 depending upon which blank X or Y is involved and the forward end of the blank is thus released. The natural spring in the blank thereupon tends to throw its released edge outwardly at a tangent to the drum wheels surface.

However, the rotation timing between drum wheels and cylinder and between the meeting of the forward end of the blank and the winding spindle unit is so exact that the forward edge easily enters between the spindle 526 and the raised blank guide roller 583 as shown at the center in Fig. 32. It then passes around the winding spindle and under the pressure rollers 554, 555.

After insertion of the forward end of the blank into the spindle unit, the roller bracket 561 is shifted back into its original position by the cam 617 and the blank guide roller 583 snaps down tight on the blank for the continuing winding action.

In this way the forward end of the blank is held in engagement with the winding spindle while the remainder of the blank is still on the drum wheels being held by the other two sets of suction cups 241 or 242. That forward part of the blank which engages against the spindle is the unmoistened portion and the part free of adhesive and which will be the inside wall of the finished body.

It should be remembered, that both cylinder and drum wheels are constantly rotating as is also the winding spindle 526 and the pressure roller 555. As these latter elements progressively wind or wrap the blank around the spindle the corresponding progressive transfer of the blank from drum wheels to spindle proceeds without interruption. During this transfer action, the vacuum on the middle then on the rear holding suction cups 241 or 242 is broken as required to release the blank from the drum wheels.

This wrapping or winding of the blank around the spindle is effected very rapidly so that the tail end of the blank is completely drawn in and removed from danger of striking the following spindle unit which is being brought into position to receive the next subsequent blank. By the time the winding spindle has moved into the position of the upper spindle unit of Fig. 32 only a short portion of its unwound tail part is left extending out as shown. Even after the blank is fully wrapped around the spindle the latter continues to rotate and the pressure rollers continue to exert their pressure on the formed can body so that the adhesive between the can body walls is pressed tightly into a well bonded condition.

This rolling and pressing of the formed can body continues until it is brought adjacent the bottom of the cylinder 501 where it is discharged. To effect this discharge the spindle is withdrawn lengthwise from inside the body and the guide brackets 561, 597 carrying the elements 582, 583, 602 and the pressure rollers 554, 555 disposed on each side of the stationary guide 551 are spread apart as shown in the lower spindle unit in Fig. 32. So released the body falls unhindered into a discharge chute 621 (Fig. 32) located under the spindle cylinder and is thereby directed to any suitable place of deposit. The chute is supported on a pedestal 622 secured to the base plate 53.

Spreading apart of the guide brackets 561, 597 will first be explained in more detail. Guide bracket 561 which carries the guide 582, the guide roller 583, and the rotating pressure roller 554 are again shifted by the cam 617 as hereinbefore when the action was to permit entrance of the blank into the unit. The discharge movement, however, of the bracket is greater in extent and creates a larger space between the bracket and the body.

The body as soon as it has been stripped from its spindle is struck from above and this speeds up its falling action. This is effected by a kicker plate 623 (Fig. 32) which is secured to a lug 624 formed on the guide bracket 561. The free end of the plate is normally disposed in a slot 620 formed in the stationary guide 551, but when the bracket 561 is opened the kicker plate moves out of its slot and strikes the body a sharp blow sending it toward the discharge chute.

Shifting of the guide bracket 597 which carries the guide 602 and the pressure roller 555 is also effected by cam action. For this purpose the rock shaft 599 (Figs. 28, 31 and 32) is provided with a cam arm 625 which carries a cam roller 626 which operates on a cam surface 627 (see also Fig. 34) formed on the outer edge or periphery of the cam 617.

The cam roller is held in engagement with its cam surface by a compression spring 628 which is interposed between a lug 629 (see also Fig. 30), formed on the spindle unit bracket 552, and a block 631 secured by a pivot pin 632 to the cam arm. The spring is coiled around a support rod 633 the outer end of which is guided in a hole in the lug 629. The inner end of the rod is secured in the pivot block 631.

After a body is discharged from a spindle unit the guide brackets are returned to their half open original position in readiness to receive and operate on a subsequent blank.

Withdrawing of the winding spindle 526 from within the formed can body is also the result of cam action. The inner end of each tubular shell 629 is provided with a cup shaped head 635 (Fig. 33) which houses a self-aligning ball bearing 636. The inner race of the ball bearing is secured to the inner end of a rod 641 which is located within the spindle sleeve 531. The outer end of the rod extends beyond the sleeve and is guided in a runway formed in cooperating blocks 642, 643 (Fig. 38) which are bolted together and at the same time are held in place within a wide groove 644 formed in the outer surface of the cylinder extension 508.

The outer end of the rod 641 is formed with rack teeth which mesh with a spur gear 648 (see also Figs. 3 and 38) mounted on a stud 649 which at one end is carried in a boss 651 formed in a slide member 652. At its other end the stud is engaged in a boss 653 formed as a part of a bridge bracket 654 which is integral with the slide and which extends up over the gear 648. The slide is retained in place along one edge by a guide 656 which is formed as a part of the block 643 and along its opposite edge by a similar guide 657. These guides are bolted to the extension 508 and are located within the groove 644. Gear 648 is formed integrally with a pinion 661 which meshes with a stationary rack 662 disposed parallel to the slide and located on top of the slide guide 657 where it is bolted in place on the cylinder extension.

The slide 652 is adapted to be reciprocated within its guides 656, 657 and hence carries a cam roller 665 (Figs. 3, 33 and 39) mounted on a pin 666 secured in the bottom of the slide. The roller extends down through a slot 667 formed in the cylinder extension and operates in a cam groove 668 formed in a stationary barrel cam 669 secured on the inside of the auxiliary frame stand 512.

Hence as the cylinder 501 and its extension 508 rotate with the winding spindle units, the cam roller 665 on the slide 652 of each unit rides around the cam 669 within the groove 668. The cam groove thus holds each winding spindle in its extended position for the major part of the revolution of the cylinder 501 but withdraws the same when passing adjacent the can body discharge chute 621. During this period the shape of the cam groove is such as to shift the slide outwardly or toward the right as viewed in Fig. 33. This action rolls the pinion 661 along the stationary rack 662 and thus rotates the gear 648.

Rotation of the gear 648 draws the rack bar 641 outwardly and thus slides the spindle into its sleeve 531 so that no part of it projects as shown in Fig. 36. It is this movement that withdraws the spindle from within the can body formed thereon.

A stripper collar 675 (Figs. 34 and 36) threaded on the outer end of the sleeve 531 remains stationary when the spindle is drawn into the sleeve and hence serves to strip the body off the spindle. After the stripped off body falls into the discharge chute the spindle is again pushed out into its original position by the cam 669 where it is ready to receive a subsequent blank from the transfer drum wheels.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a fiber can body making machine, the combination of feeding devices for feeding prepared blanks having a dried adhesive on a surface thereof, blank treating means for bringing said adhesive on a fed blank into a tacky condition, rotatable winding means for receiving said fed blank and for winding it into a can body having laminated and tightly bonded side walls, and means for bodily moving said winding means in a predetermined path of travel during the winding operation.

2. In a fiber can body making machine, the combination of feeding devices for feeding prepared blanks having a dried adhesive on a surface thereof, blank treating means for bringing said adhesive on a fed blank into a tacky condition, a rotating spindle for receiving a treated blank, guiding elements surrounding said spindle for directing said blank around said spindle, a pressure member adjacent said guiding elements, said pressure member pressing said blank against said spindle as the latter rotates for winding said blank into a can body having laminated side walls tightly bonded together by said adhesive, and means for bodily moving said rotating spindle in a circular path of travel during the winding operation.

3. In a fiber can body making machine, the combination of a rotating spindle for receiving a blank, movable guide elements disposed adjacent said spindle for shaping said blank therearound, pressure members adjacent to and movable with said guide elements for pressing said blank against said spindle as the latter rotates for winding the blank into a cylindrical can body, means for bodily moving said spindle in an endless path of travel during the winding operation, actuating means for said guiding elements and said pressure members, said actuating means operating in time with the feeding of said blank for shifting one of said guide elements relative to said spindle to admit an end of a fed blank between the guiding elements and the spindle, and means for axially moving said spindle relative to the formed cylindrical can body to strip the latter from the spindle and to discharge the finished can body from the machine.

4. In a fiber can body making machine, the combination of feeding devices for feeding individual prepared blanks having a dried adhesive on a surface thereof, transfer devices for receiving a fed blank and for conveying the same in a predetermined path of travel, blank treating means disposed adjacent the path of travel of said transfer devices for rendering tacky said adhesive on a said blank, a rotating spindle adjacent said transfer devices and actuated in time with the movement of the latter for receiving said blank guiding elements surrounding said spindle for directing said blank around said spindle, pressure members adjacent said guiding elements for pressing said blank against said spindle as the latter rotates for winding said blank into a can body having laminated side walls tightly bonded together by said adhesive, and means for bodily moving said rotating spindle in a circular path of travel during the operation of winding said blank thereon into a completed can body.

5. In a fiber can body making machine, the combination of a rotating spindle for receiving a blank, guiding elements surrounding said spindle for directing said blank around said spindle, pressure members adjacent said guiding elements, said pressure members pressing said blank against said spindle as the latter rotates thereby winding said blank into a can body having laminated side walls, means for bodily moving said spindle in a circular path of travel during the winding operation, and means for withdrawing said spindle from within a finished can body to discharge the same from the spindle.

6. In a fiber can body making machine, the combination of a rotating spindle for receiving a blank, guiding elements surrounding said spindle for directing said blank therearound, pressure members adjacent said guiding elements for pressing said blank against said spindle as the latter rotates thereby winding said blank into a can body having laminated side walls, means for bodily moving said spindle in a circular path of travel during and after the winding operation, means for withdrawing said spindle from within a finished can body, and a stripper element adjacent said spindle for stripping said can body therefrom as the spindle is withdrawn.

7. In a fiber can body making machine, the combination of devices for feeding prepared blanks having a dried adhesive on a surface thereof, blank treating means for changing said adhesive on a fed blank into a tacky condition, a rotatable member disposed adjacent said blank feeding devices, a plurality of rotatable spindles mounted on said member for receiving treated blanks, means for rotating said spindles in unison, guiding elements surrounding each of said spindles for directing a received blank therearound, pressure members adjacent said guiding elements for pressing a received blank against its spindle as the latter rotates and for winding said blank into a can body having side walls tightly bonded together by said adhesive, and means for continuously and bodily moving said rotating spindles in a circular path of travel during the winding operation.

8. In a fiber can body making machine, the combination of devices for advancing a prepared blank having a dried adhesive on a surface thereof along a predetermined path of travel, a manifold over which said fed blank is passed, an inlet pipe on said manifold for conveying steam thereto, a condensing device inside said manifold for condensing said steam into a water vapor, said manifold having an opening adjacent said condensing device for discharging said water vapor onto said fed blank for rendering its adhesive tacky, a revoluble winding element disposed adjacent said blank advancing device for receiving a treated blank therefrom and for winding it into a tubular can body, and means for continuously rotating and bodily moving said winding element in a circular path of travel during the winding operation.

9. In a fiber can body making machine, the combination of feeding devices for advancing prepared blanks having a dried adhesive on a surface thereof along a predetermined path of travel, a manifold over which said fed blanks are passed, said manifold discharging a water vapor onto a passing blank for bringing said adhesive into a tacky condition, a plurality of rotatable winding elements disposed adjacent said feeding device for receiving treated blanks therefrom and for winding the same into tubular can bodies, and means for continuously rotating and bodily moving said winding elements in a circular path of travel during said winding operations.

10. In a fiber can body making machine, the combination of feeding devices for feeding individual blanks having a dried adhesive thereon, a transfer mechanism for receiving a said fed blank and for continuously advancing it in a circular path of travel, a rotatable winding element for receiving a said blank from said transfer mechanism and for winding it into a tubular can body, and means for continuously rotating and bodily moving said winding element in a circular path of travel during the winding operation.

11. In a fiber can body making machine, the combination of devices for feeding blanks previously prepared with a dried adhesive, a rotating transfer drum mounted adjacent said feeding devices for receiving a fed blank therefrom and for carrying it along a curved path of travel, suction cups in said drum for holding said received blank in a predetermined position thereon while the drum is rotating, means for drawing a vacuum on said suction cups and for breaking said vacuum in time with the rotation of said drum, a winding element adapted to receive said blank from said transfer drum and to wind it into a finished can body.

12. In a fiber can body making machine, the combination of devices for feeding fiber blanks, a rotating transfer drum mounted adjacent said feeding devices for receiving a fed blank therefrom and for carrying it along a curved path of travel, suction cups in said drum for holding said received blank in a predetermined position thereon while the drum is rotating, means for drawing vacuum on individual suction cups at different times for progressively holding said blank on said transfer drum as it is fed from said feeding devices and for breaking said vacuum in the same order for progressively releasing said blank from said transfer drum and in time with the rotation of said drum, and a winding element adapted to receive said blank from said transfer drum and to wind said blank into a finished can body.

13. In a fiber can body making machine, the combination of devices for feeding fiber blanks, a rotating transfer drum mounted adjacent said feeding devices for receiving and holding a plurality of fed blanks and for carrying them around a curved path of travel, a plurality of sets of suction cups in said drum for holding said received blanks in predetermined positions thereon while the drum is rotating, means for drawing a vacuum independently on each set of suction cups for progressively engaging different sections of said blanks and for also breaking the vacuum in the same order to progressively release the blanks from said transfer drum and in time with the rotation thereof, and a winding element adapted to receive each of said blanks from said transfer drum and to wind it into a finished can body.

14. In a fiber can body making machine, the combination of a transfer mechanism for receiving a blank having a dried adhesive coating and for conveying it along a predetermined path of travel, means for projecting a water vapor on said blank while being conveyed by said transfer mechanism for moistening the adhesive thereon to change it into a tacky condition, and an instrumentality adjacent said transfer mechanism for removing excess water vapor deposited thereon during said moistening of the blank.

15. In a fiber can body making machine, the combination of a fiber blank feeding device, a transfer drum for receiving a fed blank, suction cups in said transfer drum for holding a received blank thereon, means for drawing a vacuum on said suction cups, a blank detecting device operating on said transfer drum for detecting when no blank is received thereon, and instrumentalities operable by said detecting device for cutting off the vacuum from said suction cups when no blank is received on said transfer drum.

16. In a fiber can body making machine, the combination of a feeding device for feeding fiber blanks having a dried adhesive thereon, a transfer drum for receiving a fed blank, an adhesive moistening device adjacent said transfer drum for rendering tacky the adhesive on said blank while it is on said drum, suction cups in said transfer drum for holding a received blank thereon, means for drawing a vacuum on said suction cups, a blank detecting device operating on said transfer drum for detecting when no blank is received thereon, and instrumentalities operable by said detecting device for cutting off the vacuum from said suction cups when no blank is received on said transfer drum, said instrumentalities also operating to render said moistening device inoperative.

17. In a fiber can body making machine, the combination of a fiber blank feeding means, transfer means disposed adjacent said feeding means for receiving a fed blank therefrom, means carried by said transfer means for holding a received blank thereon, means for actuating said holding means, means cooperating with said transfer means for detecting the absence of a blank thereon, and means operable by said detecting means for rendering said blank holding means ineffective when no blank is received by said transfer means.

18. In a fiber can body making machine, the combination of means for feeding fiber blanks having a dried adhesive thereon, a blank transfer means disposed adjacent said feeding means for successively receiving the fed blanks therefrom, an adhesive moistening device disposed adjacent said transfer means for rendering tacky the adhesive on said blank while it is on said transfer means, means carried by said transfer means for holding the received blanks thereon, means for actuating said holding means, means cooperating with said transfer means for detecting the absence of a blank thereon, and means operable by said detecting means for rendering said blank holding means ineffective when no blank is received on said transfer means, said last mentioned means being further operable to render said moistening device inoperative.

HORACE J. PAYNTER.